(12) United States Patent
Anvik

(10) Patent No.: US 10,549,919 B2
(45) Date of Patent: Feb. 4, 2020

(54) DEVICE AND METHOD FOR SINGULATION OF USED BEVERAGE OR FOOD CONTAINERS

(71) Applicant: Tomra Systems ASA, Asker (NO)

(72) Inventor: Anders Anvik, Oslo (NO)

(73) Assignee: TOMRA SYSTEMS ASA, Asker (NO)

( * ) Notice: Subject to any disclaimer, the term of this patent is extended or adjusted under 35 U.S.C. 154(b) by 0 days.

(21) Appl. No.: 16/315,584

(22) PCT Filed: Jul. 6, 2017

(86) PCT No.: PCT/EP2017/066936
§ 371 (c)(1),
(2) Date: Jan. 4, 2019

(87) PCT Pub. No.: WO2018/007524
PCT Pub. Date: Jan. 11, 2018

(65) Prior Publication Data
US 2019/0344969 A1    Nov. 14, 2019

(30) Foreign Application Priority Data

| Jul. 6, 2016 | (EP) | 16178096 |
| Aug. 30, 2016 | (EP) | 16186310 |
| Dec. 22, 2016 | (EP) | 16206226 |

(51) Int. Cl.
*B65G 29/02* (2006.01)
*B65G 47/14* (2006.01)
(Continued)

(52) U.S. Cl.
CPC ......... *B65G 29/02* (2013.01); *B65G 47/1457* (2013.01); *B65G 47/256* (2013.01);
(Continued)

(58) Field of Classification Search
CPC .... B65G 29/02; B65G 47/14; B65G 14/1457; B65G 47/642; B65G 47/256;
(Continued)

(56) References Cited

U.S. PATENT DOCUMENTS

| 3,338,373 A | 8/1967 | Aidlin et al. |
| 3,862,536 A * | 1/1975 | Litchfield ............ B65G 29/02 |
| | | 53/246 |

(Continued)

FOREIGN PATENT DOCUMENTS

| DE | 1183433 B | 12/1964 |
| EP | 0305355 A1 | 3/1989 |

(Continued)

OTHER PUBLICATIONS

International Preliminary Report on Patentability (PCT/IPEA/4090) dated Sep. 10, 2018, by the European Patent Office as the International Searching Authority for International Application No. PCT/EP2017/066936.

(Continued)

*Primary Examiner* — James R Bidwell
(74) *Attorney, Agent, or Firm* — Buchanan, Ingersoll & Rooney P.C.

(57) ABSTRACT

A device for singulation of used beverage or food containers received in bulk into individual objects, including: a first receiving area arranged for simultaneously receiving and keeping a plurality of containers; a second receiving area positioned at a higher vertical level than the first receiving area, wherein the device further includes a transporting device including a container elevating member for transporting a container from the first receiving area to the second receiving area, wherein the elevating member is attached to the transporting device, moves along and is locked to a circumferential path around a first axis upon activation of (Continued)

the transporting device, and the first axis is inclined at an angle of 1° to 45° relative the horizontal plane.

9 Claims, 21 Drawing Sheets

(51) Int. Cl.
*B65G 47/64* (2006.01)
*B65G 47/256* (2006.01)

(52) U.S. Cl.
CPC .... *B65G 47/642* (2013.01); *B65G 2201/0244* (2013.01); *B65G 2201/0252* (2013.01)

(58) Field of Classification Search
CPC .... B65G 2201/0235; B65G 2201/0241; B65G 2201/0252; G07F 7/06
USPC ............................................ 198/393, 397.01
See application file for complete search history.

(56) References Cited

U.S. PATENT DOCUMENTS

| | | | |
|---|---|---|---|
| 4,238,023 A * | 12/1980 | Millar | B65G 47/1478 198/388 |
| 4,653,627 A | 3/1987 | Hampson et al. | |
| 5,090,031 A | 2/1992 | Pyne et al. | |
| 7,565,959 B2 * | 7/2009 | Nalbach | B65G 29/02 198/392 |
| 2001/0052445 A1 | 12/2001 | Coyne et al. | |
| 2003/0010597 A1 | 1/2003 | Kiva et al. | |
| 2006/0090984 A1 * | 5/2006 | Nalbach | B65G 29/02 198/397.03 |
| 2009/0127169 A1 * | 5/2009 | Boe | G01R 31/2893 198/393 |
| 2012/0118700 A1 | 5/2012 | Handschick | |
| 2014/0238821 A1 * | 8/2014 | Woinski | B65G 17/46 198/464.2 |

FOREIGN PATENT DOCUMENTS

| | | |
|---|---|---|
| EP | 2517988 A1 | 10/2012 |
| JP | S488598 Y1 | 3/1973 |
| JP | H09255133 A | 9/1997 |
| JP | 2002037440 A | 2/2002 |
| WO | 2014122305 A1 | 8/2014 |

OTHER PUBLICATIONS

International Search Report (PCT/ISA/210) dated Sep. 13, 2017, by the European Patent Office as the International Searching Authority for International Application No. PCT/EP2017/066936.
Written Opinion (PCT/ISA/237) dated Sep. 13, 2017, by the European Patent Office as the International Searching Authority for International Application No. PCT/EP2017/066936.

* cited by examiner

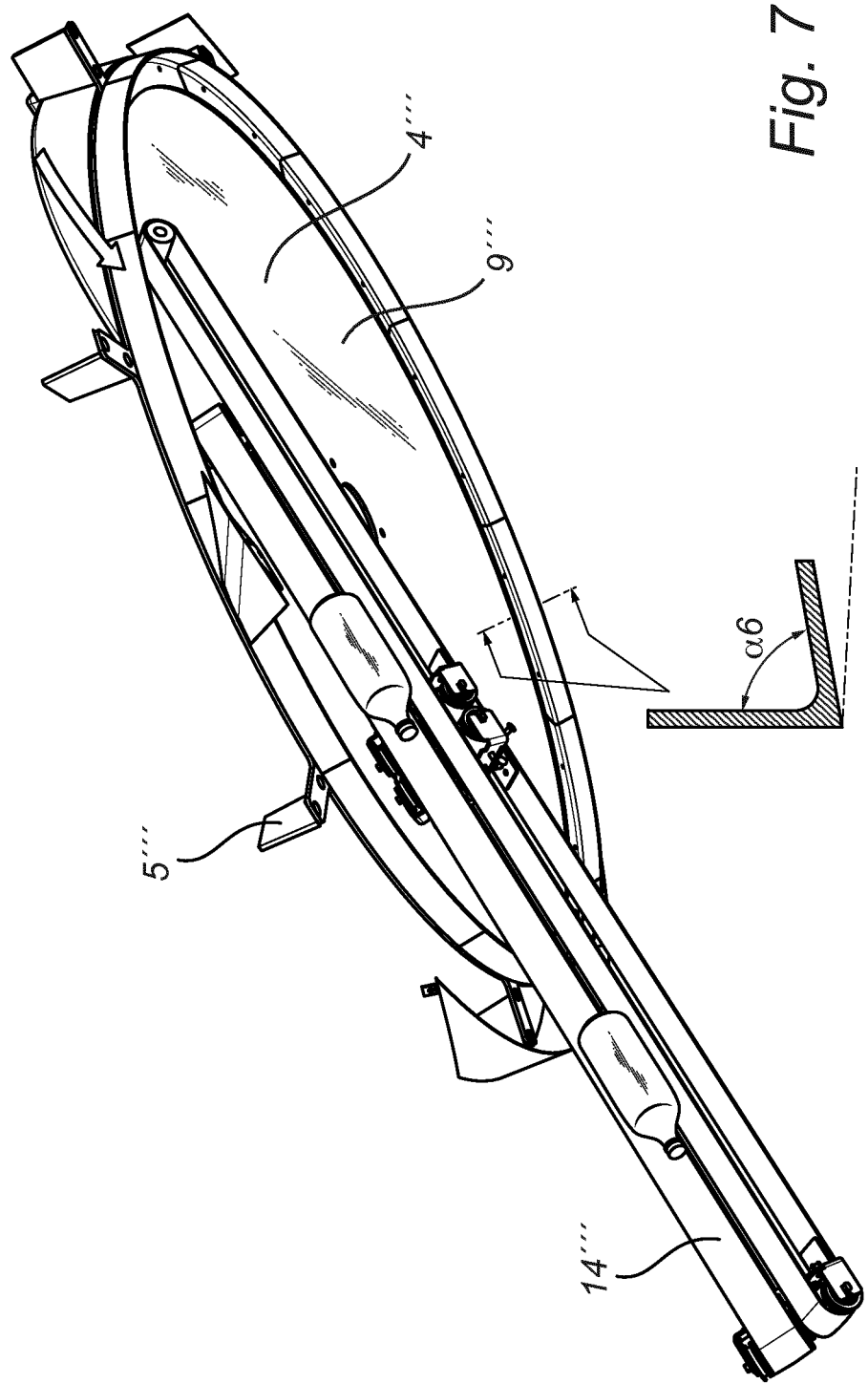

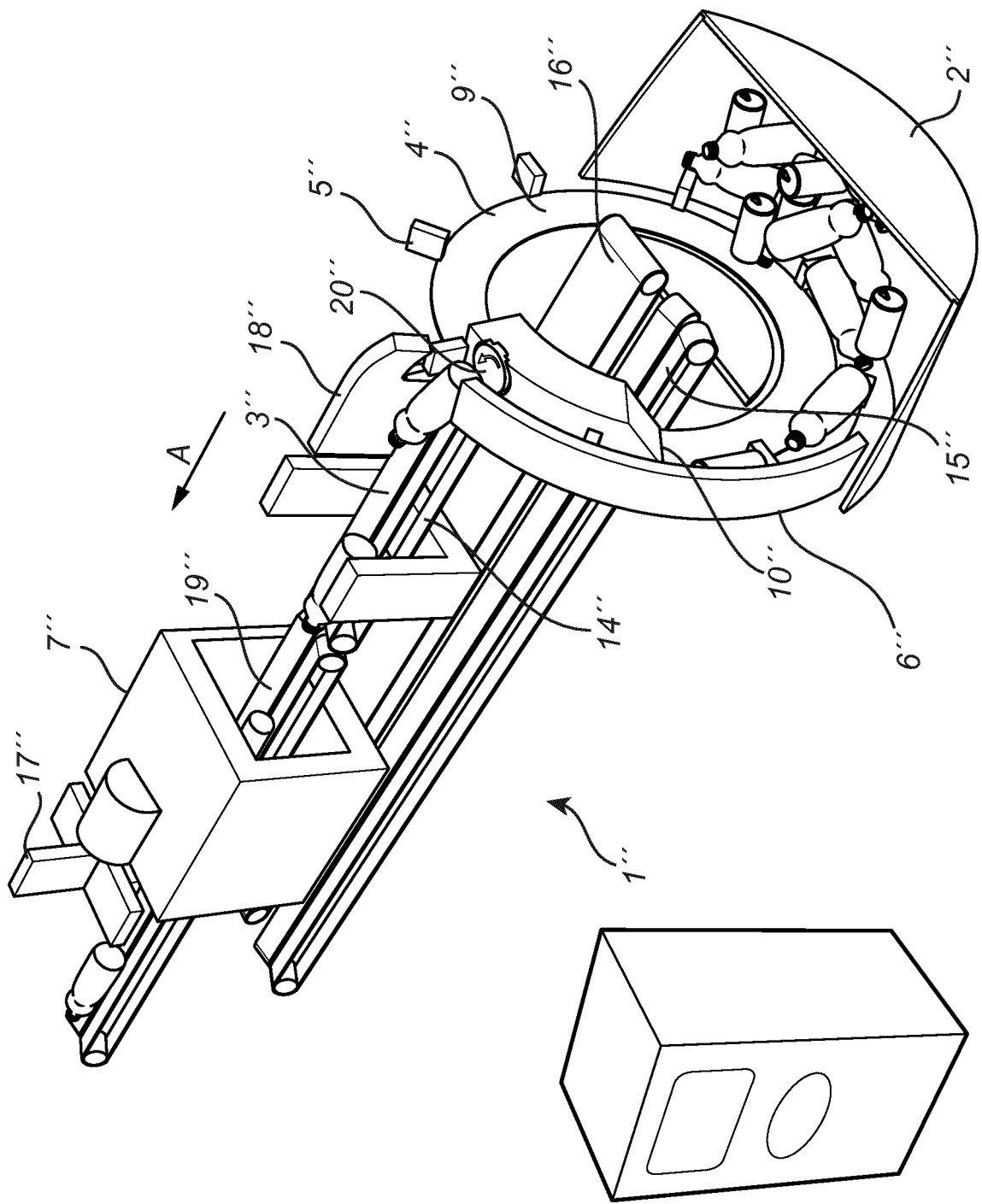

DEVICE AND METHOD FOR SINGULATION OF USED BEVERAGE OR FOOD CONTAINERS

TECHNICAL FIELD

The present disclosure relates to a device and method for singulation of objects, such as used beverage and food containers, received in bulk.

BACKGROUND

Devices for receiving, identifying and/or sorting objects, such as used beverage or food containers, may be used in reverse vending machines in e.g. super markets. Typically, these devices receive the containers one by one, and a user therefore has to feed the containers one by one to the device.

An example of a device adapted for receiving objects, such as used beverage or food containers in bulk, and forwarding them for individual processing is disclosed in WO 2014/122305 A1. The objects are received at a circular rotating surface which is substantially horizontal and descending towards the periphery of the surface. A conveyor belt is arranged in vicinity of the rotating surface such that objects leaving the surface will end up at the conveyor belt. The objects are thereby separated into individual objects and can be transported further for e.g. recording, counting, evaluating, sorting, storing or recycling.

Another example of a device for receiving objects, such as containers, in bulk and processing the objects individually is disclosed in EP0305355 A1. This document discloses a device where the objects are received at a circular surface and elevated upwardly by means of inclined ramp segments of the surface to a rotating rim where they are separated.

These devices are however bulky and space consuming and therefore not adapted for use in reverse vending machines in e.g. a supermarket.

There is hence a need for a less bulky device which may be used in reverse vending machines and which is adapted for receiving more than one container at the time.

SUMMARY

It is an object of the present disclosure to provide an improved and more compact device for receiving used beverage or food containers in bulk and forwarding them for individual processing. It is also an object to provide a method for singulation of used beverage or food containers.

The invention is defined by the appended independent claims, with embodiments being set forth in the appended dependent claims, in the following description and in the drawings.

According to a first aspect there is provided a device for singulation of used containers received in bulk, such as used food or beverage containers, into individual objects, comprising:

a first receiving area arranged for simultaneously receiving and keeping a plurality of containers;

a second receiving area positioned at a higher vertical level than the first receiving area, and wherein the device further comprises a transporting device comprising a container elevating member for transporting a container from the first receiving area to the second receiving area, wherein the elevating member is attached to said transporting device, which transporting device is configured to move said container elevating member along a circumferential path around a first axis (x) upon activation of the transporting device, said first axis (x) being inclined at an angle of 1° to 45° relative the horizontal plane, and said container elevating member is locked to said circumferential path during the elevation of said containers, and wherein the container elevating member, when arranged at a container drop-off point along said circumferential path, the container elevating member slopes downwardly as seen radially inwards;

said container drop-off point being arranged between said first receiving area and the point where the elevating member reaches its top most position along said circumferential path.

Moreover, there is provided a device for singulation of used beverage or food containers received in bulk into individual objects, comprising:

a first receiving area arranged for simultaneously receiving and keeping a plurality of containers;

a second receiving area positioned at a higher vertical level than the first receiving area, characterized in that the device further comprises a transporting device comprising a container elevating member for transporting a container from the first receiving area to the second receiving area wherein the elevating member is attached to said transporting device, moves along and is locked to a circumferential path around a first axis upon activation of the transporting device, and the lower portion which first axis is inclined at an angle of 1° to 45° relative the horizontal plane The process of separating containers for individual forwarding and processing may be referred to as singulation.

By bulk is meant that more than one container can be received by the device simultaneously, and preferably that the containers can be of various material, shapes and sizes such as tin cans, cylindrical, square or odd-shaped bottles, TetraPak containers etc. Furthermore, the food or beverage containers may be made of different materials, such as plastic, paper, metal or glass, or a combination thereof. The device may be adapted for being able to receive and process all or some of the different standard sizes of containers in different countries. It may e.g. be able to handle a mix of 33 cl and 50 cl tin cans, as well as 33 cl, 50 cl and 1.5 l PET bottles.

In certain embodiments, the device is provided with a front wall. A front wall is, in relation to the transporting device, to be understood as being a wall that is substantially parallel with a plane in which the circumferential path is arranged. The front wall is to be understood as extending so that it is arranged adjacent to at least 25% of the circumferential path, preferably adjacent to at least 50% of the portion of the circumferential path extending from the first receiving area to the second receiving area, most preferably adjacent to the entire portion of the circumferential path extending from the first receiving area to the second receiving area. The front wall is to be understood as being offset the transporting device or the center of the container elevating members by at least 3 cm, preferably at least 5 cm, most preferably at least 10 cm. The front wall is to be understood as being offset the transporting device or the center of the container elevating members by no more than 30 cm, preferably no more than 25 cm, most preferably no more than 20 cm. The front wall is to be understood as being offset in the same direction as the container elevating members extend from the transporting device. The front wall is to be understood as being offset the transporting device in a direction that is substantially parallel with the first axis.

According to one exemplary embodiment, the transporting device is not provided with a front wall.

According to one exemplary embodiment, the container elevating member extends outside the transporting device in a radial direction.

This enables containers elevated by the container elevating member to be transported across the transporting device in a direction backwards relative to the transporting device. Thus, containers can be transported between the container elevating members and over the edge of the transporting device.

According to one example the diameter, or length, of the container that is transported by the device is at least 20 mm or at least 50 mm; and/or at most 150 mm, or at most 200 mm, or at most 350 mm. Additionally or alternatively, the height (i.e. the longest side) of the container that is transported by the device is at least 50 mm, or at least 75 mm; and/or at most 200 mm, or at most 380 mm, or at most 500 mm. Additionally or alternatively, the weight of the container that is transported by the device is at least 10 g; and/or at most 3 kg, or at most 5 kg. Additionally or alternatively, the volume of the container that is transported by the device is at least 10 ml, or at least 50 ml; and/or at most 3 liters, or at most 5 liters, or at most 8 liters.

By higher vertical level of second receiving area relative the first receiving area is meant that a major portion of the second receiving area is arranged above the first receiving area. Hence, the containers are transported from a lower vertical level to a higher vertical level when being brought from the first receiving area to the second receiving area. The height difference between said first receiving area and said second receiving area may be at least 0.2 m, or at least 0.4 m, or at least 0.6 m, or at least 0.8 m, or at least 1 m, or at least 1.2 m, or at least 1.5 m. Additionally or alternatively, the height difference between said first receiving area and said second receiving area may be at most 0.6 m, or at most 0.8 m, or at most 1 m, or at most 1.2 m, or at most 1.5 m, or at most 1.7 m, or at most 2. Additionally or alternatively, the height difference between said first receiving area and said second receiving area may be 900 mm-1100 mm; or 800 mm-1200 mm; or 500 mm-2 000 mm. Additionally or alternatively, said second receiving area may be arranged at least 0.8 m, or at least 1.0 m, or at least 1.1 m, or at least 1.2 m, or at least 1.4 m, or at least 1.6 m, or at least 1.8 m above the floor. Additionally or alternatively, said second receiving area may be arranged at most 2.2 m, or at most 2.0 m, or at most 1.8 m, or at most 1.6 m, or at most 1.4 m, or at most 1.2 m above the floor The first axis is an axis around which the transporting device is rotatable. According one embodiment said first axis is arranged at the center of said circumferential path.

Since the transportation of the containers from the first to the second receiving area mainly takes place in the vertical plane, the device can be made less bulky as compared to prior art devices for singulation of objects.

Since the device is able to receive containers in bulk a user can feed a plurality of containers at the same time and does not have to feed the containers one by one to the device. Thereby the recycling of containers may be easier and less time consuming, and hence more user friendly.

Moreover, since the containers can be received in bulk by the device, the problem that the user gets in contact with food and/or drink residues from the containers may be reduced.

The transportation device may be arranged such that the container elevating member, also referred to as elevating member, elevating means or container elevating means, may continuously follow the same path and/or may continuously follow the same path revolution after revolution. This e.g. achieved when the transporting device comprises a rotatable plate, a frame or a conveyor belt to which the elevating member is fixedly attached the motion of which describes a full turn. In more detail, when the transporting device is a rotatable plate to which the elevating member is attached, the elevating member will continuously follow the same path, i.e. the elevating member will start at one position in space and revert to the same position in space upon a full rotation of the plate, thereby completing one turn or one revolution, and if the plate keeps rotating the elevating member follows the same path during its second round or revolution as it followed during its first. In other words, the elevating member continuously follows the same path.

When the container elevating member is locked to a circumferential path it continuously follows this path revolution after revolution.

The path described by the elevation member may be confined to one geometrical plane, and/or the path to which the container elevating member is locked may be confined to one geometrical plane at least when disregarding small disturbances such as vibration.

The transportation device may be arranged such that the lowest vertical position which the elevating member passes upon rotation of the transport device, or a lower portion of the path described by the elevating member, is within the area or space where at the bulk of containers are stored or kept before singulation. This area or space includes and/or coincides with and/or overlaps the first receiving area. In other words, the lower portion and/or lowest portion of the path described by the elevating member passes through the bulk of containers. This lower portion of the path may or may not include the lowest portion of path, or the lowest vertical position which the elevating member passes upon rotation of the transport device. Additionally or alternatively, the first axis is arranged above, or at a higher vertical level than, the area or space where at the bulk of containers are kept before singulation. Additionally or alternatively, the elevating member is locked to a curved path through the area or space where at the bulk of containers are stored or kept before singulation. Additionally or alternatively, the elevating member enters at one end of the receptacle, wherein the bulk of containers are stored or kept before singulation, and leaves the receptacle at an opposite end. Optionally, the cross-section of this receptacle is elongated, or the cross-section of the area or space where at the bulk of containers are stored or kept before singulation is elongated, and the elevating member enters at one of the short sides and leaves at an opposite short side; the cross-section is preferably taken parallel with the horizontal plane.

By a rotatable plate or frame is meant that the transporting device may be formed as a solid plate, or a frame with e.g. one or more openings or arms.

By rotatable is meant that upon activation by e.g. a motor, the transporting device may rotate in the clockwise or anti-clockwise direction.

The elevating member may be fixedly attached to the transporting device by fixing means, such as screws, bolts or adhesive etc.

The number of elevation means attached to the transportation device may be between 1 and 20, and/or the number of elevation means is at least 2, 4, 6, 8, 10, 12, 14 or 16, and/or the number of elevation means is not more than 6, 8, 10, 12, 14, 16, 18 or 20.

The first axis may be inclined with respect to the horizontal plane by 1° to 40°. Additionally or alternatively, the inclination of the first axis with respect to the horizontal plane may be more than 1°, 5°, 10°, 20°, 30° or 35°; and/or less than 40°, 35°, 25°, 20°, 15° or 10°.

By arranging the device substantially vertical the device may be more compact and hence less space consuming.

The device may be provided with retaining means arranged for facilitating the retention of a container in the transporting device while it is brought from the first receiving area to the second receiving area.

The retaining means may be a peripheral barrier, wall or plate preferable arranged at the outer periphery of the transporting device, which retaining means may extend in the radial direction and/or in a direction transversal to the first axis. When the retaining means is arranged at the elevating means at the outer periphery of the transporting device and extending in the radial direction, a transported container will be arranged between the retaining means and the axis of rotation, and the container will be forced against the retaining means due to e.g. a radial acceleration of the bottle. According to one exemplary embodiment, said retaining means is flexibly connected to said device, such that said retaining means may be deflected in a radial direction. This allows the containers to deflect the retaining means outwardly as they are transported from the first receiving area to the second receiving area, when the containers are making first contact with the retaining means. It is the end of the retaining means that is located closest to the first receiving area that is connected to the device, the other end may deflect outwards, away from the first axis. By being flexibly connected to the device, such deflection causes the retaining means to push back against the containers, thus holding them in place on the container elevating members. This deflection happens when a container of a size larger than a predetermined size is being transported from the first receiving area to the second receiving area. When a container that is smaller than this predetermined size is being transported from the first receiving area to the second receiving area, the retaining means is not deflected radially outwards. If the retaining means extends transversal or orthogonal to the first axis, and the first axis is inclined by e.g. 40° to a horizontal plane, a transported container will normally slide to rest against these retaining means during transportation. The device of the present invention may be provided with retaining means extending in the radial direction and/or with retaining means extending in a direction transversal to the first axis. Thus, a device according to the present inventive concept may be provided with both types of retaining means, as well as other types of retaining means.

Alternatively, the retaining means may be arranged radially below the elevating means.

The retaining means may be planar and/or curved and extend from the elevating means in the direction of transportation.

According to one exemplary embodiment, said device comprises secondary retaining means.

According to one exemplary embodiment, said secondary retaining means is arranged for retaining a container on the container elevating members while said container is being brought from the first receiving area to the second receiving area.

According to one exemplary embodiment, said secondary retaining means is a barrier that is substantially parallel with said transporting device.

Said secondary retaining means may for example be a wall offset from said circumferential path. Said secondary retaining means may for example be offset in the direction of the rotational axis and/or in the radial direction. Said wall may for example be arranged at a distance from said circumferential path such that a container may fit between the transporting device and the secondary retaining means. Thus, the secondary retaining means in combination with the transporting device and any other retaining means forms a channel or passage through which the containers may pass as they move from said first receiving area to said second receiving area. This allows the secondary retaining means to prevent the containers from falling off the container elevating members and down into the first receiving area.

According to one exemplary embodiment, said secondary retaining means is flexibly connected to said device, such that said secondary retaining means may deflect in a direction that is substantially parallel with said first axis. This is to be understood as meaning that the distance between the secondary retaining means and the transporting device may be increased by a container causing the secondary retaining means to flexibly deflect away from said transporting device. The retaining means and the secondary retaining means are arranged to aid in the transportation of both small and large containers, by means of the flexible connection between each one of the two retaining means and the device. As the secondary retaining means is caused to flexibly deflect away from said transporting device, it may push back against the containers, if these are larger than a predetermined size, thus holding them in place on the container elevating members.

According to one exemplary embodiment, said secondary retaining means comprises a container securing flange, said container securing flange being a portion of said secondary retaining means that protrudes in a direction away from said circumferential path at an angle relative to the remainder of said secondary retaining means.

This helps align containers that are slightly misaligned with the circumferential path of the container elevating members. This also ensures that the containers are held in place on the container elevating members as they are transported from the first receiving area to the second receiving area.

The secondary retaining means may for example extend from a position proximal to the drop-off point of the containers, to a position halfway between the first receiving area or the lowest portion of the circumferential path and the drop-off point.

According to one exemplary embodiment, said device further comprises tertiary retaining means arranged for retaining a container on the container elevating members while being brought from the first receiving area to the second receiving area.

According to one exemplary embodiment, said tertiary retaining means is arranged along and adjacent to a portion of said circumferential path. The tertiary retaining means may thus be seen as extending along a path that is concentric with the circumferential path of the container elevating members.

According to one exemplary embodiment, said tertiary retaining means is arranged along and adjacent to said circumferential path, radially inwards of said container elevating members. Thus, containers elevated by said container elevating members may rest on a container supporting surface of said tertiary retaining means as they are transported from said first receiving area to said second receiving area.

According to one exemplary embodiment, said tertiary retaining means extend along at least 10% of the circumference of said circumferential path or of said transporting device, preferably along at least 15% of the circumference of said circumferential path or of said transporting device, most preferably along at least 20% of the circumference of said circumferential path or of said transporting device. Additionally or alternatively, said tertiary retaining means extend along no more than 33% of the circumference of said circumferential path or of said transporting device, preferably along no more than 30% of the circumference of said circumferential path or of said transporting device, most preferably along no more than 25% of the circumference of said circumferential path or of said transporting device. For example, said tertiary retaining means extend along 10% to 33% of the circumference of said circumferential path or of said transporting device.

According to one exemplary embodiment, one end of said tertiary retaining means is located at a position proximal to said drop-off point. This is to be understood as meaning that said tertiary retaining means extends from an upper portion of said transporting device and down towards said first receiving area. The tertiary retaining means may for example extend from a position proximal to the drop-off point of the containers, to a position located no more than 66% of the circumferential distance to the lowest portion of the circumferential path or of the transporting device.

According to one exemplary embodiment, said tertiary retaining means comprises a container supporting surface proximal to an uppermost portion of said transporting device and facing radially outwards.

According to one exemplary embodiment, said tertiary retaining means comprises a wedge-shaped portion arranged to deflect containers from said container supporting surface of said elevating members if said containers are misaligned thereon.

According to one exemplary embodiment, said wedge-shaped portion of said tertiary retaining means tapers off in a circumferential direction towards said first receiving area. Said tapering is provided at an angle of 10°-45°, as measured between said tapering surface and a surface parallel to said transporting device. In other words, said wedge-shaped portion may be seen as pointing towards said first receiving area.

According to one exemplary embodiment, the elevating member is arranged to singulate or single out, or separate the container from the bulk of containers by means of a scooping action, a nudging action and/or a pushing action of the elevating member.

According to one exemplary embodiment, the second receiving area is a portion of a plate or a conveyor belt, and preferably an upper portion of a plate or a conveyor belt.

By this arrangement the containers may quickly be transported away from the second receiving area such that there is space for other container brought from the first receiving area to enter the second receiving area.

According to one exemplary embodiment, the transporting device and the second receiving area are arranged such that a container being brought from the first receiving area by the transporting device leaves the transporting device partly or fully due to the act of gravity, and/or by a sliding motion and/or a free falling motion, and enters the second receiving area.

Each elevating member has a container supporting surface which is in contact with the container during the transportation of the container from the first receiving area to the drop-off point. According to one embodiment the container is in contact with the same surface portion of the container elevating member during the whole transport of the container, in this a case this surface portion equals the container supporting surface. According to another embodiment the container may be in contact with different surface portions of the elevating member during this transport, in this a case the sum of these surface portions equals the container supporting surface. If the drop-off point, i.e. the point where the container leaves from the elevating means and enters the second receiving area, is arranged higher in the vertical level as compared to the second receiving area, the container may fall to the second receiving area due to the act of gravity.

Alternatively, if the drop-off point is located at the same vertical level as the second receiving area, the container may slide off by a sliding motion from the elevating member and thus entering the second receiving area.

The transportation device may be arranged such that a container leaves the elevating member, before the elevating member has reached its top most position. This may be achieved by a suitable inclination of the elevating member, in combination one or more guiding surfaces. In other words, as seen along the circumferential path, and in the direction of motion of the container elevating member, the container elevating member first passes the receiving area, then the drop-off point and thereafter the point where the container elevating member is arranged in its highest vertical position or reaches its top most position. When arranged at the drop-off point the elevating member, or the carrying surface of the container elevating member, slopes downwards, or is inclined downwards, as seen radially inwards, so that the container leaves the container elevating member fully or partly due to the act of gravity. When the container partly leaves the container elevating member due to the act of gravity, it may e.g. be aided to leave the container elevating member by use of pressurized air, i.e. the container may be aided to leave by being hit by a puff of pressurized air or other pressurized media such as water or gas.

The expression "a container supporting surface of the container elevating member slopes downwardly as seen radially inwards, when said container elevating member is arranged at a container drop-off point along said circumferential path" means that: when the container elevating member is arranged at a container drop-off point, the outer end of the container supporting surface of the container elevating member is arranged at a higher vertical position compared to the inner end of the container supporting surface of the container elevating member as seen radially inwards, but it does not require that the container supporting surface of the container elevating member is parallel with the radial direction, i.e. the direction pointing towards the center of the circumferential path.

The outer end of the container supporting surface of the container elevating member is arranged at a greater distance from the center of said circumferential path compared to the inner end of the container supporting surface of the container elevating member. According to one embodiment, the inner end of said container supporting surface corresponds to the end or edge of said container supporting surface at which said container leaves the container elevating member.

When the container elevating member is arranged at the container drop-off point, the container supporting surface of the container elevating member may be parallel with the radial direction. Alternatively, when the container elevating member is arranged at a container drop-off point, and while sloping radially inwards, the container supporting surface of the container elevating member may deviate by no more than 1°, or by no more than 3°, or by no more than 5°, or by no more than 10°, or by no more than 15°, or by no more than 20° from the radial direction. Additionally or alternatively, when the container elevating member is arranged at a container drop-off point, and while sloping radially inwards, the container supporting surface of the container elevating member may deviate by at most 1°, or by at most 3°, or at most 5°, or by at most 10°, or by at most 15°, or by at most 20° from the radial direction. According to one embodiment the first axis is arranged straight above said first receiving area. In relation to this invention, the expression "X is arranged straight above Y" means that there is a vertical plane that intersects both X and Y, and a vertical plane is a plane which normal is horizontal.

The containers received in bulk may be of various shapes, sizes, and masses and different containers may have slightly different drop-off points; the range of which makes up a drop-off section along the circumferential path. When this is the case, the drop-off point as referred to above is the median drop-off point for the range of bottles that the singulation device is designed to handle, i.e. according to its manual/product specification or the like. According to an alternative embodiment, the drop-off point may be the highest drop-off point, in the vertical direction, along the drop-off section that the singulation device is designed to handle.

According to one embodiment the transportation device is arranged such the first axis (x), when projected onto the horizontal plane, is orthogonal or deviates from being orthogonal with 0° to 20°, with respect to a main transportation direction of a container in the second receiving area.

In other words, when the first axis is projected onto the horizontal plane, the first axis is parallel to and/or coincides with the transportation direction at the second receiving area. Additionally or alternatively, when the first axis is projected onto the horizontal plane, the first axis deviates from the transportation direction at the second receiving area with 0° to 20°.

According to one embodiment the transportation device is arranged such that first axis (x), when projected onto the horizontal plane, is parallel or deviates from being parallel with 0° to 20° with respect to a main transportation direction of a container in the second receiving area. In other words, when the first axis is projected onto the horizontal plane, the first axis is orthogonal to the transportation direction at the second receiving area; or deviates from being orthogonal to the transportation direction at the second receiving area with 0° to 20°.

According to one embodiment, the length of the elevating member in the radial direction is between 2-20 cm, or 3-10 cm or 4-8 cm, and/or equal to or greater than 2 cm, or 3 cm, or 4 cm, and/or equal to or less than 20 cm, or 10 cm, or 8 cm, and/or the length of the elevating member in a direction orthogonal to the radial direction is between 2-20 cm, or 3-10 cm or 4-8 cm, and/or equal to or greater than 2 cm, or 3 cm, or 4 cm, and/or equal to or less than 20 cm, or 10 cm, or 8 cm. In other words, when the elevating member is a rectangular plate, the length of the elevating member in the radial direction being 6.0 cm and the length of the elevating member in a direction orthogonal to the radial direction being 6.0 cm; the surface area used for elevating a container is 36.0 cm². The elevating member may have many shapes, it may be e.g. be rectangular, circular, square, polygonal or a combination of these shapes.

Additionally or alternatively, the size of container supporting surface of the elevating member is 20% larger than the size or diameter of the smallest object the device is designed to handle; and/or 40% smaller than the size or diameter of the largest object device is designed to handle.

When designing container elevating member, the skilled person may by aid of this description and by trial and error identify a suitable shape of the container elevating member. For example, for a flat container elevating member the size of the container supporting surface is normally a tradeoff between different parameters: e.g. the rate at which the containers may reach the second surface are, the capability of picking up the containers one by one, the stability of the elevation i.e. that the container does not fall back to the first receiving area before reaching the drop-off point, the success rate of picking up a container each time the elevating member passes the first receiving area, that the container has the correct orientating (for bottles normally: top first). and that the elevating member causes a sufficient displacement of the bottles in the first receiving area, which effectively avoids that the system comes to a halt.

Depending on the application one or a few of these parameters are identified as more important, and the design of the singulation device, the elevating member and/or the container supporting surface of the elevating member is designed keeping these prioritized parameters in mind.

A test, involving bottles having a diameter from 50 mm to 100 mm, and performed with a device arranged as described in relation to FIGS. 3a and 3b, the transporting device having the same velocity at all test, while the elevating members were of different sizes, led e.g. to the following conclusions:

for elevating members having a very large surface area (e.g. 50×80) three or even four object was picked up at a time by the same container elevating member; which might lead to congestion at the second receiving area;

also for elevating members with large surface areas (e.g. 80×80) more than one object were picked up at a time;

for small surface areas (e.g. 40×40) all objects are elevated to the second receiving area, but the rate at which the bottles reach the second receiving surface is low, i.e. many elevating members fail to pick up a bottle; also the elevating members were too short to efficiently rearrange the bottles in the first receiving area, resulting in little rotation/displacement of the bottles and leading to that the whole system occasionally comes to a halt as the elevating members were not able to pick-up the bottles arranged closest to the pick-up section;

a slightly larger surface area (50×50) resulted in a fairly low speed/transportation rate (i.e. the rate at which the bottles reach the second receiving area); due to the small surface area the transport of the larger bottles was a bit unstable; the length of the elevating member was still a bit too short in order to provide an efficient rearrangement of the bottles in the first receiving area;

a slightly larger surface area (60×60), resulted in few double objects as well as giving good speed/transportation rate.

a slightly larger surface area (70×70) gives a good rearrangement in the first receiving area, which effectively avoids that the system comes to a halt; however, the system occasionally picks up more than one bottle at a time.

If the rate at which the bottles successfully reaches the second receiving area is of importance, an elevating member having a surface area of about 60×60 could be chosen, when handling bottles having a diameter from 50 mm to 100 mm. [all measures in the section above are given in mm unless stated otherwise]

According to one exemplary embodiment, the second receiving area comprises means for transporting a container towards a container inspection area. The direction in which these means transport the containers are may also be referred to as the transportation direction at the second receiving area.

The means for transporting may be e.g. a conveyor belt, such as a V conveyor or a flat conveyor. Alternatively, the second receiving area may be a plate which is tilted towards the inspection area such that containers are transported or slides towards the inspection area. Alternatively, the plate is tilted towards a conveyor belt, such that containers are transported or slides towards a conveyor belt, which conveyor belt in turn transports the containers towards an inspection area. In this latter case, According to one exemplary embodiment, the container inspection area comprises inspection means, the inspection means comprising a camera and/or a scanner and a decision unit arranged for receiving a signal from the inspection means and based on this signal being arranged to send a container to e.g. a sorting station, back to the first receiving area or to an outfeed of the device.

The inspection means may capture an image or a photo of the whole or a part of a container. Alternatively, a scanner may be used to scan e.g. a bar code to obtain identification information about the container or the profile of the container.

Based on the information obtained by the inspection means, e.g. type, shape, size, color etc. of the container, the decision unit decides how the container should be handled. The container may e.g. be classified as invalid or potentially valid. Invalid containers are normally returned to the user, and potentially valid containers may be fed to further inspection areas. If there are no further inspection areas, the container may instead be classified as valid.

According to one exemplary embodiment, the second receiving area comprises at least a portion of a conveyor belt, wherein the first axis (x), when projected onto the horizontal plane, is provided at an angle to the longitudinal axis of the conveyor belt, when projected onto the horizontal plane, wherein said angle is greater than 90°, most preferably greater than or equal to 95°. Additionally or alternatively, said angle is less than or equal to 130°, preferably less than or equal to 120°, most preferably less than or equal to 110°. For example, said angle is greater than 90° and less than or equal to 130°.

According to one exemplary embodiment, said conveyor belt is arranged so that it extends in a direction that deviates from a tangential direction of said transporting device by no more than 45°, preferably by no more than 35°, most preferably by no more than 25°.

The tangential direction is to be understood as being parallel with the tangent of the circumference of said transporting device at a position proximal to the second receiving area.

Thus, containers that have been singulated by said container elevating members and brought to said second receiving area may move from said transporting device to said conveyor belt without any significant change of direction. Thus, a smoother transition between the transporting device and the second receiving area may be achieved.

According to one exemplary embodiment, said conveyor belt is a V-conveyor comprising two belts.

Thus, a more secure receipt of the singulated containers may be achieved. Furthermore, identifying and discarding misaligned containers from a V-conveyor is easier than doing so from a flat conveyor.

According to one exemplary embodiment, each belt extends from a respective starting end to a respective distal end, wherein said starting end of one of the two belts is offset the starting end of the other belt along the extension of the V-conveyor.

As the V-conveyor may be arranged at an angle relative said transporting device, having one band being offset the other allows the V-conveyor to be arranged closer to the transporting device. Thus, the amount of non-active bridging surfaces between said transporting device and said second receiving area is reduced.

According to one exemplary embodiment, said starting end of each one of said belts is located at a position proximal to the second receiving area.

Thus, soon after the singulated containers leave the transporting device, the V-conveyor engages the containers and transports them away from said second receiving area. This reduces the risk of having containers stuck on a non-active surface between said transporting device and said V-conveyor.

According to one exemplary embodiment, said conveyor belt has a width that is less than 90 mm, preferably less than 80 mm, most preferably less than 70 mm, as measured in a direction that is perpendicular to a transporting direction of the conveyor belt and that is parallel with the horizontal plane.

By having a conveyor belt that has a width that is less than 90 mm, misaligned containers may fall off the conveyor belt without being forced to do so by means of e.g. a sorting device or sorting arrangement, Thus, a more efficient sorting out of misaligned containers may be achieved.

According to one exemplary embodiment, said conveyor belt has no side walls. This enables containers to fall off the conveyor belt more easily.

According to one exemplary embodiment, said two belts are arranged at an angle relative to each other, wherein said angle is greater than 40°, most preferably greater than 45°. Additionally or alternatively, said angle is between less than 80°, preferably less than 70°, most preferably less than 60°. For example, said angle is between 40° and 80°.

Thus, a more secure receipt and transportation of the singulated containers may be achieved.

According to one exemplary embodiment, said transporting device comprises a front surface and a back surface.

Said front surface is to be understood as being a surface of said transporting device that is substantially perpendicular to said first axis. Said back surface is to be understood as being a surface that is substantially parallel with said front surface. Said back surface is offset relative to said front surface in a direction away from said first receiving area along said first axis.

According to one exemplary embodiment, said transporting device further comprises a peripherally arranged flange.

According to one exemplary embodiment, said flange extends towards and beyond said back surface of said transporting device.

Said flange may act as a bridging surface between said transporting device and said second receiving area, thus reducing the risk of containers or other objects falling down behind the transporting device as the containers are transported therefrom to said second receiving area.

According to one exemplary embodiment, said flange is arranged at an angle relative to said transporting device, wherein said angle is less than 110°, preferably less than 90°, most preferably less than 85°. Additionally or alternatively, said angle is greater than 40°, preferably greater than 65°, most preferably greater than 75°. For example, said angle is between 40° and 110°.

By having the flange arranged at an angle lower than 90° relative to the transporting device, the containers may be caused to slide across said flange and down towards said second receiving area once the container elevating members reach a container drop-off point. Additionally or alternatively, having the flange arranged at an angle relative to the transporting device such that a top portion of the flange slopes downwards from the transporting device, relative to the horizontal plane, allows the containers to slide across said flange and down towards said second receiving area once the container elevating members reach a container drop-off point.

According to one exemplary embodiment, said elevating members are arranged to protrude from a periphery of said transporting device.

Thus, the front surface of the transporting device does not obstruct the path of the containers as they leave the container supporting surface of the container elevating members and enter the second receiving area at the container drop-off point.

According to one exemplary embodiment, said elevating members extend beyond said flange, in a direction from said first axis towards said circumferential path.

Thus, the flange may be used to guide the containers so that they slide off the container elevating members onto the second receiving area as the container elevating members reach the container drop-off point. In other words, the containers do not drop from one level to another when traveling from said first receiving area to said second receiving area. This enables a more controlled and secure transportation of the containers.

According to one exemplary embodiment, each one of said container supporting surfaces of said elevating members is arranged at an angle relative to said front surface of said transporting device, wherein said angle is less than 120°, preferably less than 115°, most preferably less than 110°. Additionally or alternatively, said angle is greater than 90°, preferably greater than 95°, most preferably greater than 100°. For example, said angle is between 90° and 120°.

That the container supporting surfaces slope inwards or backwards as seen along said first axis, in combination with the transporting device being angled relative to the horizontal plane, allows the containers elevated by said container elevating members to rest against a portion of said device while they are transported from said first receiving area to said second receiving area. Said device may for example comprise a fixed supporting wall arranged at least around the periphery of said transporting device and/or along the circumferential path of the container elevating members. This supporting wall may act as a support for the containers as they move along the circumferential path of the container elevating members.

According to one aspect of the invention, a device for singulation of used beverage or food containers received in bulk into individual objects is provided, said device comprising:
a first receiving area arranged for simultaneously receiving and keeping a plurality of containers;
a second receiving area positioned at a higher vertical level than the first receiving area,
characterized in that
the device further comprises a transporting device comprising a container elevating member for transporting a container from the first receiving area to the second receiving area, wherein the elevating member is attached to said transporting device, which transporting device is configured to move said container elevating member along a circumferential path around a first axis (x) upon activation of the transporting device, said first axis (x) being inclined at an angle of 5° to 45° relative the horizontal plane, and said container elevating member is locked to said circumferential path during the elevation of said containers, and
wherein a respective container supporting surface of each one of said container elevating members is angled inwards relative to said transporting device, wherein said angle is greater than 60°, preferably greater than 65°, most preferably greater than 70°. Additionally or alternatively, said angle is less than 90°, preferably less than 85°, most preferably less than 80°. For example, said angle is between 60° and 90°.

According to a further aspect of the invention, there is provided a reverse vending machine comprising a device according to any of the preceding claims.

What is described above in relation to the devices for singulation, may also be applied to the methods for singulating used beverage or food containers presented below.

According to a further aspect, there is provided: a method for singulating used beverage or food containers received in bulk into individual objects, comprising:
providing a first receiving area arranged for simultaneously receiving and keeping a plurality of containers;
arranging a second receiving area at a higher vertical level than the first receiving area;
providing a transporting device comprising a container elevating member, which is movable along and locked to a circumferential path around a first axis, which first axis (x) is inclined at an angle of 0 to 45° relative the horizontal plane, the transporting device being arranged in such a way that upon activation thereof a container located in the first receiving area is brought by the elevating member of the transporting device to the second receiving area;
activating the transporting device such that a container located in the first receiving area is brought by the elevating member to the second receiving area.

According to a yet further aspect, there is provided: a method for singulating used beverage or food containers received in bulk into individual objects, comprising:
providing a bulk of containers in a first receiving area;
providing a transporting device comprising a container elevating member for transporting a container from said first receiving area to a second receiving area being arranged at a higher vertical level compared to the first receiving area, wherein said container elevating member is attached to said transporting device,
activating said transporting device, upon which activation said transporting device moves said container elevating member along a complete circumferential path around a first axis (x), said first axis (x) being inclined at an angle of 0° to 45° relative the horizontal plane, and said container elevating member is locked to said circumferential path, and
when being transported along said circumferential path said container elevating member passes from a container pick-up section, via a container drop-off point, to its top most position in the vertical direction,
wherein the container elevating member, when arranged at the drop-off point along said circumferential path, the container elevating member slopes downwardly as seen radially inwards.

In relation to this invention the term "full circumferential path" refers to that the path describes a full lap or revolution, i.e. when following the path, a full lap or revolution, the direction of motion makes a 360° turn and the path returns to where it started.

In relation to this invention the term "pick-up section" refers to the section along the circumferential path where the containers are singled out or picked-up from the bulk of containers.

Itemized List of Embodiments

Item 1. A device for singulation of used beverage or food containers received in bulk into individual objects, comprising:

a first receiving area arranged for simultaneously receiving and keeping a plurality of containers;

a second receiving area positioned at a higher vertical level than the first receiving area, characterized in that the device further comprises a transporting device comprising a container elevating member for transporting a container from the first receiving area to the second receiving area, wherein the elevating member is attached to said transporting device, which transporting device is configured to move said container elevating member along a circumferential path around a first axis upon activation of the transporting device, said first axis being inclined at an angle of 0° to 45° relative the horizontal plane, and said container elevating member is locked to said circumferential path during the elevation of said containers, and wherein a container supporting surface of the container elevating member slopes downwardly as seen radially inwards, when said container elevating member is arranged at a container drop-off point along said circumferential path;

said container drop-off point being arranged between said first receiving area and the point where the elevating member reaches its top most position along said circumferential path.

Item 2. The device according to item 1, which transporting device comprises a rotatable plate, a frame or a conveyor belt to which the elevating member is fixedly attached.

Item 3. The device according to any of the preceding items, wherein the first axis is inclined relative to the horizontal plane by 0° to 40°.

Item 4. The device according to any of the preceding items, wherein the device comprises retaining means arranged for retaining a container in the transporting device while being brought from the first receiving area to the second receiving area.

Item 5. The device according to any of the preceding items, wherein the elevating member is arranged to single out a container from the bulk of containers by means of a scooping action, a nudging action or a pushing action of the elevating member.

Item 6. The device according to any of the preceding items, wherein the second receiving area is a portion of a plate or a conveyor belt.

Item 7. The device according to any of the preceding items, wherein the transporting device and the second receiving area are arranged such that a container being brought from the first receiving area by the transporting device leaves the transporting device due to the act of gravity or by a sliding motion and enters the second receiving area.

Item 8. The device according to any of the preceding items, wherein the first axis, when projected onto the horizontal plane, is orthogonal or deviates from being orthogonal with 0° to 20° with respect to a main transportation direction of a container in the second receiving area.

Item 9. The device according to any of items 1 to 7, wherein the first axis, when projected onto the horizontal plane, is parallel or deviates from being parallel with 0° to 20° with respect to a main transportation direction of a container in the second receiving area.

Item 10. The device according to any of the preceding items, wherein the transporting device is arranged such that portion of, or the whole of, the elevating member is arranged to travel through at least a portion of the first receiving area upon activation of the transporting device.

Item 11. The device according to any of the preceding items, wherein the length of the elevating member in the radial direction is between 2-20 cm, and/or wherein the length of the elevating member in orthogonal to the radial direction is between 2-20 cm.

Item 12. The device according to any of the preceding items, wherein the second receiving area comprises means for transporting a container towards a container inspection area.

Item 13. The device according item 12, wherein the container inspection area comprises inspection means, the inspection means comprising a camera and/or a scanner, and a decision unit arranged for receiving a signal from the inspection means and based on this signal being arranged to sending a container to a sorting station, back to the first receiving area or to an outfeed of the device.

Item 14. A reverse vending machine comprising a device according to any of the preceding items.

Item 15. A method for singulating used beverage or food containers received in bulk into individual objects, comprising:

providing a bulk of containers in a first receiving area;

providing a transporting device comprising a container elevating member for transporting a container from said first receiving area to a second receiving area being arranged at a higher vertical level compared to the first receiving area, wherein said container elevating member is attached to said transporting device, activating said transporting device, upon which activation said transporting device moves said container elevating member along a full circumferential path around a first axis, said first axis being inclined at an angle of 0° to 45° relative the horizontal plane, and said container elevating member is locked to said circumferential path during the elevation of said container from said first receiving area to a drop-off point, and when being transported along said circumferential path said container elevating member passes from a container pick-up section, via a container drop-off point, to its top most position in the vertical direction, wherein the container elevating member, when arranged at the drop-off point along said circumferential path, a container supporting surface of the container elevating member slopes downwardly as seen radially inwards.

DESCRIPTION OF THE DRAWINGS

FIG. 3b is a top view of the embodiment of the device shown in FIG. 3a,

FIG. 7 is a perspective view of the back side of the rotatable plate of the device of FIG. 4a, showing the flange extending around the periphery of the rotatable plate, FIGS. 17a and 17b illustrate an embodiment of the device for singulation of used food or beverage containers.

DETAILED DESCRIPTION

Figure 1:
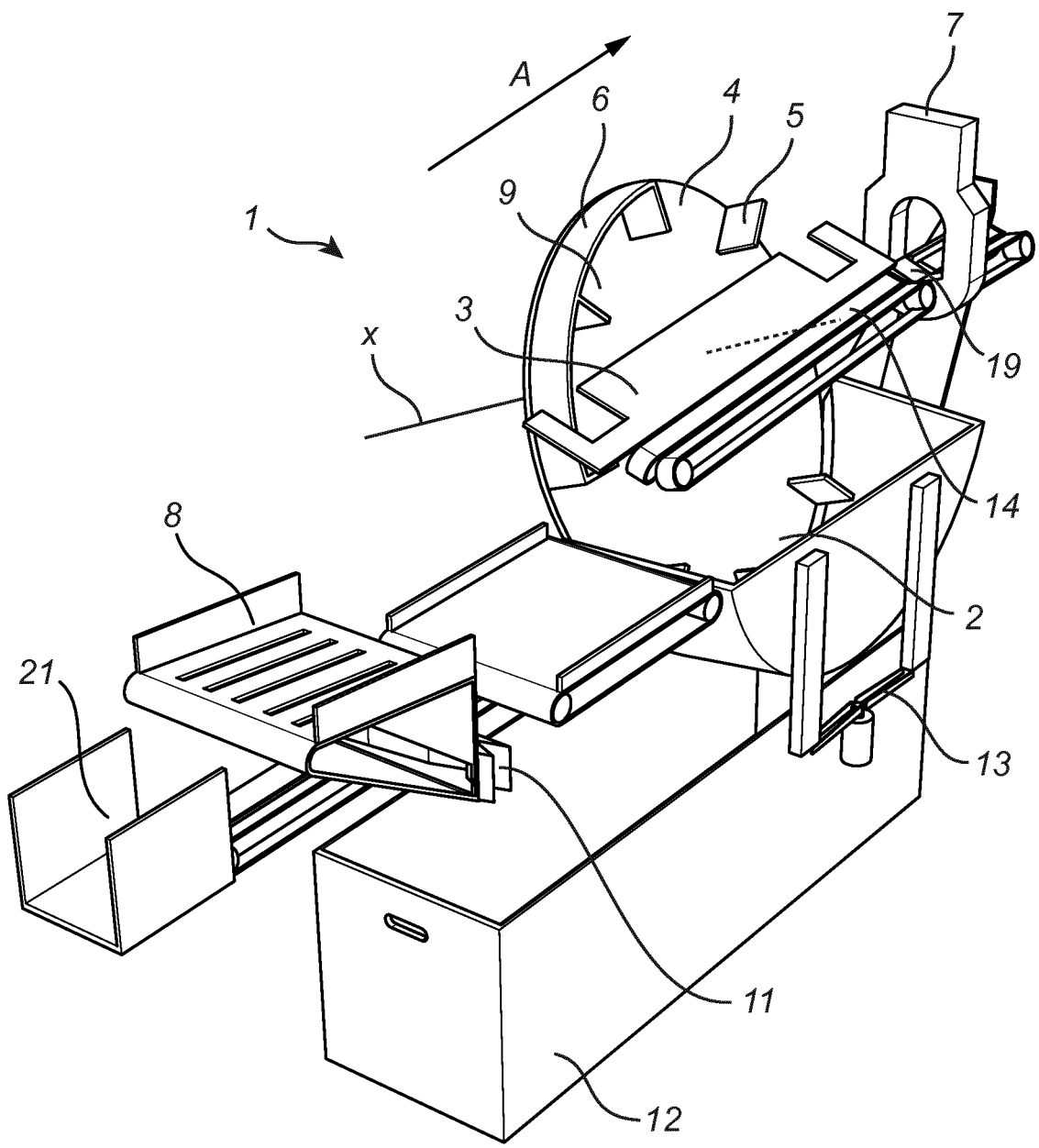
FIG. 1 illustrates a device for singulation of objects, such as used beverage and food containers, received in bulk into individual objects.

A device 1, 1', 1", 1'" for receiving objects, such as empty disposable hollow bodies, e.g. used food and/or beverage containers, in bulk and forwarding them individually for further processing will now be discussed more in detail with reference to the appended drawings.

In this document, used beverage or food containers may also be referred to as objects.

The bulk of food and/or beverage containers received by the device 1, 1', 1", 1'" may be assorted and of different shapes and sizes. For example, the containers may be cans, odd-shaped, cylindrical or square bottles, TetraPak containers etc.

The used beverage or food containers typically have an elongated shape, they can for example be substantially cylindrical.

Furthermore, the food or beverage containers may be made of different materials, such as plastic, paper, metal or glass, or a combination thereof.

The smallest container the device 1, 1', 1", 1'" is able to receive and process may have half the height of the largest container being possible to receive and process by the device.

The device 1, 1', 1", 1'" may be adapted for being able to receive and process the different standard sizes of containers in different countries.

The device 1, 1', 1", 1'" may be placed in a cabinet. As an alternative the device may be free-standing.

The device 1, 1', 1", 1'" may be located in e.g. a local store, a residential area or a car park, for receiving and processing used beverage and/or food containers from consumers, or in an industrial building for sorting and processing of used beverage or food containers.

The device 1, 1', 1", 1'" may also be placed in e.g. cargo container, e.g. at a festival area, for receiving used beverage and/or food containers.

Moreover, the device 1, 1', 1", 1'" may be used to upgrade an existing reverse vending machine, and be placed in a cabinet of such a reverse vending machine. Optionally, some of the existing hardware and/or software are used also after the upgrade. Hence, the size of the device may be adapted to the standard size of already existing reverse vending machines.

A first embodiment of the device 1 will now be discussed in detail with reference to FIG. 1.

The device 1 in FIG. 1a has a first receiving area 2 into which the containers are collected after entering the device.

The device 1 comprises a rotatable transporting device 4 provided with an elevating member 5 for transporting containers from the first receiving area 2 to a second receiving area 3. The elevating member 5 moves along and is locked to a circumferential path around a first axis x upon activation of the transporting device 4, which first axis x is inclined at an angle of 0 to 45° relative the horizontal plane.

Upon activation, here rotation, of the transporting device 4, the elevating member 5 randomly brings the containers, one by one, from the first receiving area 2 to the second receiving area 3.

The container is elevated by the elevating member 5 from the first receiving area 2 by a scooping, pushing or nudging action.

When the container is at a predetermined vertical position, the so-called drop-off point, it leaves the elevating member 5 of the transporting device 4 and falls by means of gravity, alternatively slides off by a sliding motion, to the second receiving area 3.

Hence, the transport of the containers from the first receiving area 2 to the second receiving area 3 takes place mainly in the vertical plane.

The container may then be forwarded to an inspection area 19 provided with inspection means 7 for identification of the container, see FIG. 1.

Based on the result of the identification, the container may be forwarded for further inspection, counting, recording, evaluating, sorting, storing, recycling, be returned to the user, or be returned to the first receiving area 2.

The transporting device 4 may be designed in different ways, for example it may comprise a substantially circular plate 9 as illustrated in FIG. 1. Such a plate may be solid or be provided with openings or apertures.

As an alternative the transporting device 4 may be a circular frame with a central opening.

Alternatively, the transporting device may be a conveyor belt to which the elevating member 5 is fixedly attached (not shown).

As a further alternative the transporting device 4 may be a wheel with a hub to which a number of spokes, each of which is provided with elevating members at its outer periphery (not shown).

The transporting device 4 may comprise 1-20, 1-15, 2-25 or 5-10 elevating members 5.

The number of the elevating members 5 may depend on the size of the transporting device 4. The elevating members 5 may be equally spaced or non-equally spaced around the transporting device 4.

The elevating member 5 may have a size and design adapted for bringing containers of different shapes and sizes collected in the first receiving area 2 to the second receiving area 3.

As seen in FIG. 1 the elevating member 5 may extend radially from the outer periphery of the transporting device 4 towards the center of the transporting device.

Figure 3A:
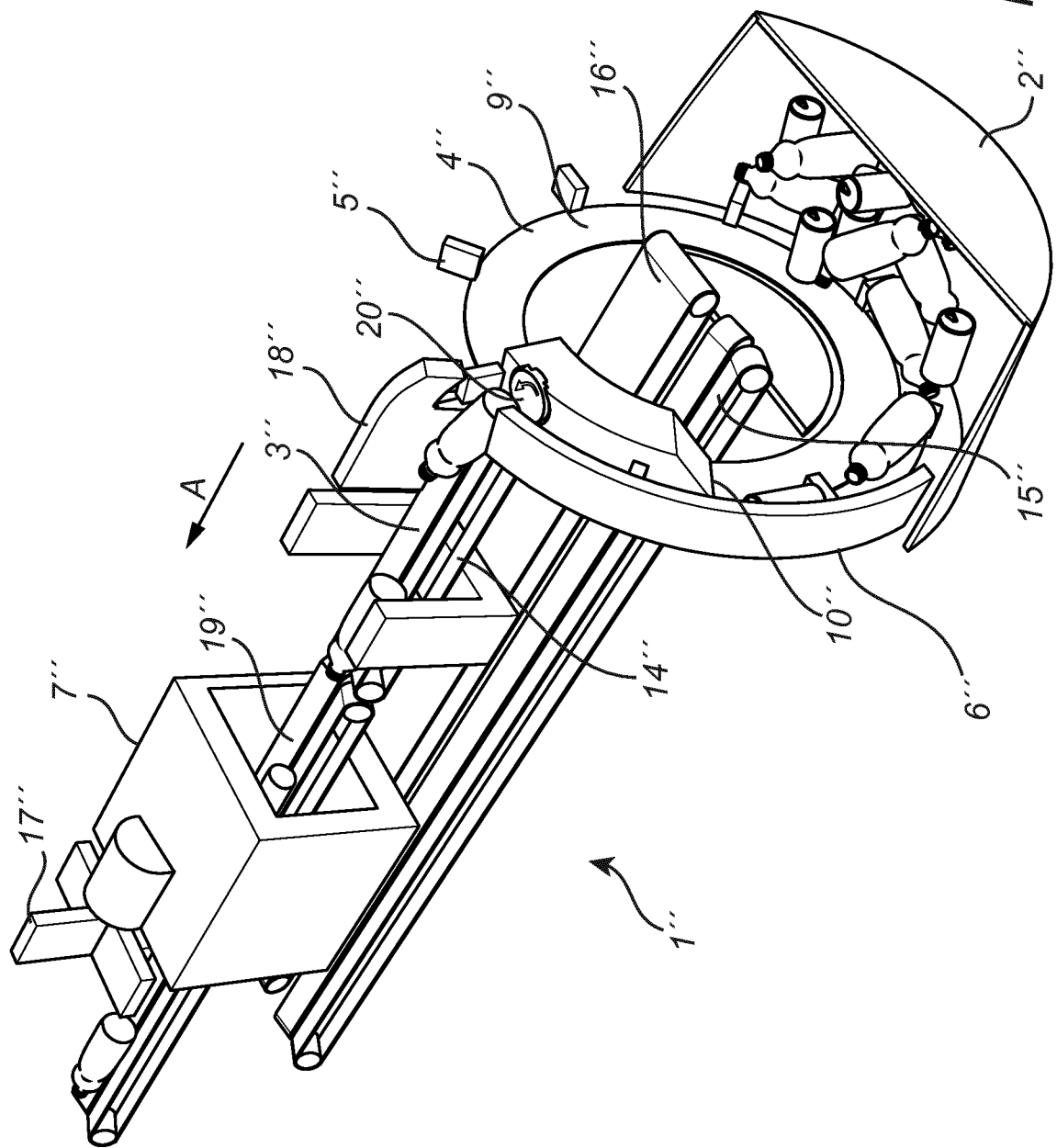
FIG. 3a illustrates a third embodiment of the device for singulation of used food or beverage containers.

As an alternative, the elevating member 5 may be arranged such that at least a portion thereof extends radially outwards from the outer periphery of the transporting device 4, as shown in FIG. 3a.

If the transporting device 4 comprises more than one elevating member 5, the size of the elevating members may, but need not, be the same.

As an alternative, the sizes of the elevating members may be different such that different elevating members 5 are adapted for different types or sizes of containers.

The distance between the elevating members 5 may be adapted to the diameter of the transporting device and hence to the application of the device 1.

As a non-binding example, the number of the elevating members may be eight and the diameter of the transporting device may be 1000 mm.

Furthermore, the elevating members may extend radially inwards to the center of the transporting device by 100 mm and axially by 150 mm.

The elevating member 5 and/or the container supporting surface of the elevating member may for example be rectangular, elliptical, flat, cup-shaped, formed as a paddle or shovel etc., or be a combination of these such as flat and rectangular. It may be solid or have small openings.

If the transporting device 4 comprises more than one elevating member 5, the shape of the elevating members may, but need not, be the same.

Further, each elevating member 5 may, but need not, be provided with a rim arranged at the outer periphery of the elevating member, and extending in the transport direction, for providing additional support to the container upon transport of the container from the first receiving area 2 to the second receiving area 3. Each elevating member 5 may additionally or alternatively be provided with a rim extending in a direction substantially orthogonal to the first axis.

The transporting device 4 may be arranged such that it is substantially parallel with a main transportation direction A of a container moving in the second receiving area 3.

As seen in FIG. 1, the transporting device 4 may further be arranged substantially vertically such that the first axis x around which upon the transporting device is rotating may be inclined with respect to the horizontal plane. In FIG. 1, the inclination of the first axis is about 15-20° with respect to the horizontal plane.

The inclination of the first axis x and hence the transporting device 4 may make it easier for the elevating means 5 to single out a container from the first receiving area 2.

The inclination of the first axis x and hence the transporting device may also prevent the containers from falling off the transporting device 4 upon activation, i.e. rotation, of the transporting device before the container reaches the drop-off point.

The transporting device 4 may be rotatable in the clockwise or anti-clockwise direction.

The transporting device 4 may be activated by a motor. Additionally or alternatively, the transporting device 4 may be activated by a driving wheel (not shown) arranged such that it is in contact with the transporting device 4. Upon activation of such driving wheel, by e.g. a motor, the transporting device may be activated. The motor may be controlled by a control unit.

The transporting device 4 may be made of metal, plastic, wood or a combination thereof.

The transporting device 4 may further comprise a retaining means 6. The purpose of the retaining means 6 is to retain the containers in the transporting device 4 when bringing the containers from the first receiving area 2 to the second receiving area 3.

As seen in FIG. 1, the retaining means 6 may be a peripheral barrier. The retaining means 6 may be arranged at and extend along the outer periphery of the transporting device 4 from the first receiving area to the drop off point. The retaining means may also have a shorter extension, and extend only along a portion of the peripheral distance between from the first receiving area to the drop off point. Additionally or alternatively, the retaining means extends also beyond the drop off point.

The retaining means 6 may be connected to an external frame and, hence, not being attached to the transporting device 4.

As an alternative, the retaining means 6 may be fixedly connected to the transporting device 4.

The retaining means 6 may e.g. be a rim made e.g. plastics, metal or wood.

As discussed above the containers received in bulk are collected in the first receiving area 2 after entering the device 1. The containers are then kept in the first receiving area 2 until they are randomly brought from the first receiving area 2 to the second receiving area 3 by the elevating member 5.

As seen in FIG. 1, the lower part of the first receiving area 2 may be arranged substantially horizontal and at a lower part of the transporting device 4.

The size and shape of the first receiving area 2 may be adapted for receiving containers of different sizes and shapes in bulk.

As shown in FIG. 1, the first receiving area 2 may be formed as a receptacle. As an example the first receiving area may be bowl-shaped.

The bottom of the first receiving area 2 may be curved having the same or a similar curvature as the periphery of the transporting device 4.

The first receiving area 2 may be adapted such that the elevating member 5 travelling through the first receiving area 2 may be able to bring containers from the first receiving area.

A lower vertical portion of the transporting device 4 may form an inner wall of the first receiving area 2.

The first receiving area 2 may be made of e.g. metal and/or plastic.

Furthermore, as seen in FIG. 1, the device 1 comprises a second receiving area 3 for receiving the containers brought by the elevating members 5 arranged at the transporting device 4 from the first receiving area 2.

The second receiving area 3 may be arranged adjacent to the transporting device 4 and at a higher vertical level with respect to the first receiving area 2.

The second receiving area 3 may be positioned substantially horizontally in the center of the transporting device, but may also be arranged at a lower or higher position.

In FIG. 1, the second receiving area 3 is a plate which is tilted outwards with respect to the transporting device 4. The tilt of the plate may enable the forwarding towards the container inspection area.

The second receiving area 3 may have an elongated shape in the horizontal direction.

Depending on the extension of the second receiving area 3 in the horizontal direction, it may have recesses at one or both ends adapted such that the elevating member 5 arranged on the transporting device 4 can pass upon activation of the transporting device 4.

The second receiving area 3, being a plate, may be made of a material of low surface friction such as stainless steel, aluminum or a suitable plastic material.

Adjacent, or slightly below, the second receiving area 3 there may be a third receiving area 14, such as a conveyor belt for facilitating transport of the containers towards the container inspection area, see FIG. 1.

The conveyor belt of the third receiving area may be a V conveyor or a flat conveyor.

As an alternative the second receiving area 3 and the third receiving area 14 may be one and the same. Such arrangement may comprise solely of a conveyor belt onto which the containers fall and are transported to the container inspection area 19 (not shown).

As a further alternative if the second receiving area 3 and the third receiving area 14 are the same, the arrangement may comprise solely of a plate made of a material with low surface friction, such as metal or a suitable plastic material, which is tilted towards the inspection area 19 such that the containers received at the combined second and third receiving area slides towards the inspection area 19.

As seen in FIG. 1, the device 1 may further comprise an inspection area 19 provided with inspection means 7 through which the containers are transported in order to identify the container. Based on the information obtained by the inspection means 7, the container may be either accepted or rejected. There are several different options how an accepted or rejected container can be handled.

According to one example, if being accepted the container may be forwarded to a box (not shown), for example a box for containers to be recycled. As an alternative there may be several different boxes to which an accepted container may be forwarded, depending on e.g. the type and/or size of the container.

If being rejected, the container may be transported back to the first receiving area 2, back to the user, or directly to a trash collector 12.

The inspection means 7 may be a camera or a scanner, such as a bar code reader.

As an example, the inspection means 7 may be an OneRing system which comprises a camera for identifying a large part of the container. The camera of the OneRing system may be able to handle 80 to 220 objects per minute.

There may be further number and types of inspection means, e.g. cameras, scanners etc., arranged in series or in parallel in order to obtain different information of the containers such that the containers can be sorted based on this information.

The inspection area 19 may further be provided with a decision unit arranged for receiving a signal from the inspection means 7 and based on this signal being arranged to send a container to a sorting station, back to the first receiving area 2 or to an outfeed 21 of the device 1.

A container may be rejected if the inspection means 7 is not able to identify the container. If being rejected, the container may be sent back to the first receiving area 2 in order to provide for another read of the container. This may be done by a conveyor belt (not shown) positioned on a lowering mechanism and being arranged after the inspection area 19 with respect to the transport direction A of a container in the second receiving area 3 and/or third receiving area 14. Such a conveyor may be folded down and thereby forwarding the container back to the first receiving area 2.

As an alternative, a rejected container may be returned back, via an outfeed 21 to the user, such that the user can determine whether he or she should insert the container in the device once again, throw away or keep the container. This may be done by a conveyor belt.

The first receiving area 2 may be mounted onto brackets which may be mounted onto or in connection with a trash collector 12, see FIG. 1. Such a trash collector may hence be situated below the first receiving area 2. The trash collector may have any shape, e.g. rectangular shape.

The trash collector may be releasable connected to the device such that it can be released and the trash collector can be emptied.

The first receiving area may further be provided with a lowering mechanism in connection with the brackets, a so-called drop-down chute 13.

Hence, the first receiving area 2 may be emptied by means of lowering the drop-down chute 13 such that the containers in the first receiving area 2 fall into the trash collector 12. This may be useful when many containers have been returned to the first receiving area 2.

For example, the first receiving area 2 may be emptied after a certain time of activation of the transporting device 4, or after a certain number of containers have been rejected and thus returned back to the first receiving area 2.

The containers ending up in the trash collector 12 may be taken care of and sorted manually or just being regarded as garbage.

The device 1 may further comprise an infeed 8 for facilitating the containers to enter the first receiving area 2.

The infeed 8 may be connected to the first receiving area 2.

In the absence of infeed 8, there may only be an opening in e.g. a cabinet in which the device 1 is placed, to which the containers can be fed. Such an opening may hence be arranged adjacent to the first receiving area 2.

The size of the opening may be adapted to allow containers of different sizes and shapes to enter into the device 1 and to fulfill the requirements of the safety standard NS-EN 349:1992+A1:2008.

Moreover, the distance between the opening and the transporting device 4 may be adapted to fulfill the requirement of the standard, ISO 13857:2008, Safety of machines.

According to a further safety standard, ISO 13857:2008 of machines, the opening should comprise different safety arrangement for preventing injuries. For example, it can comprise a light curtain with a light beam which functions such that, when the device 1 is running, the device is immediately shut down when the light beam is broken.

The infeed 8 may comprise a tray which may be slightly tilted with respect to the horizontal plane in order to facilitate the containers to be forwarded to the first receiving area 2.

The infeed may be made of a plastic material, metal and/or wood.

The infeed 8 may further comprise rims on both sides in order to retain the containers being forwarded towards the first receiving area 2 and to prevent the containers from falling off the infeed upon being forwarded to the first receiving area 2.

The tray may be provided with slits in order to handle loose objects, e.g. pieces of paper such as labels from containers, into which the loose objects can fall.

Loose objects may fall onto a steep surface located below the infeed and be guided directly or via a funnel 11 to a trash collector.

The trash collector may, but need not, be the same as the trash collector 12 or containers discussed above.

The infeed 8 may further comprise a conveyor belt in order to further facilitate transport of the containers from the tray towards the first receiving area 2. The conveyer belt may be arranged between the tray and the first receiving area of the device 1 and hence being adapted to the size of the infeed and the opening of the device.

Such a conveyor belt may comprise rims on both sides in the longitudinal direction in order to prevent the objects from falling off from the conveyor and to retain the containers towards the first receiving area 2.

The conveyor belt may be positioned substantially horizontal with respect to the horizontal plane.

Alternatively the infeed 8 may comprise solely a tray or solely a conveyor belt.

A second embodiment of the device 1' which is similar to the embodiment of the device 1 described above will now be discussed with reference to FIG. 2. The device 1' of the second embodiment differs from the device 1 of the first embodiment in that it is provided with additional retaining means 10' and in that the second receiving area 3' is arranged differently.

In this device 1' additional retaining means 10' may optionally be arranged radially inside the transporting device 4' and is arranged radially below the elevating means 5'.

The retaining means 10' may be curved and extend at least along a portion of the peripheral distance along which the container is brought between the first receiving area 2' and the second receiving area 3'.

The purpose of the retaining means 10' is to prevent the containers from falling off the transporting device 4' before reaching the drop-off point when being brought from the first receiving area 2' to the second receiving area 3'.

The retaining means 10' may be arranged on an external frame.

Figure 2:
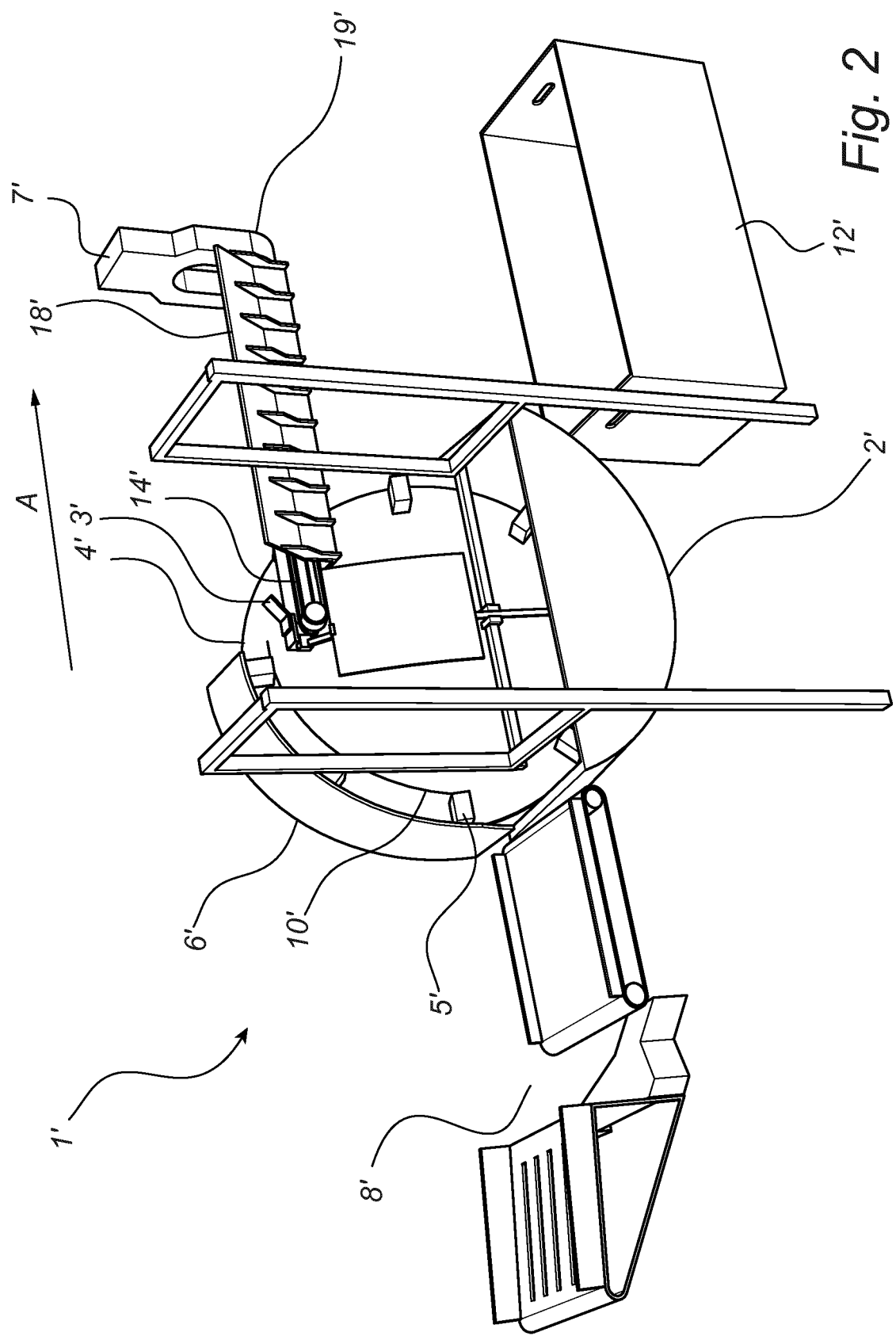
FIG. 2 illustrates a second embodiment of the device for singulation of used food or beverage containers.

As shown in FIG. 2, the second receiving area 3' may be located at a higher vertical level as compared to the second receiving area of the device in the embodiment described with reference to FIG. 1 above.

The containers may be forwarded from the elevating member 5' to the second receiving area 3' by means of gravity as discussed above.

Alternatively, they may slide off the elevating member 5' by a sliding motion when the elevating member 5' has brought a container to a predetermined vertical position, i.e. the so-called drop-off point.

How the container is released from or leaves the elevating member 5' may depend on the distance between the so-called drop-off point and the second receiving area 3'.

As seen in FIG. 2, the second receiving area 3' may be arranged at a higher part in the vertical plane of the transporting device 4' as compared to the arrangement shown in FIG. 1. Further, as shown in FIG. 2 the second receiving area 3' may extend outwards from the transporting device 4' in the horizontal plane.

The second receiving area 3' and/or the third receiving area 14' may further be provided with a retaining member 18' for retaining the containers upon being forwarded towards the inspection area 19'. The retaining member 18' may extend along the whole or a portion of the second receiving area 3' and/or third receiving area 14'. The retaining member 18' may be present on one or both sides of the second receiving area 3' and/or third receiving area 14'.

A third embodiment of the device 1" will now be discussed with reference to FIG. 3a and FIG. 3b. The device 1" of the third embodiment differs from the device 1 in FIG. 1 mainly in how the transporting device 4" is arranged in relation to the rest of the components of the device 1".

Figure 3B:
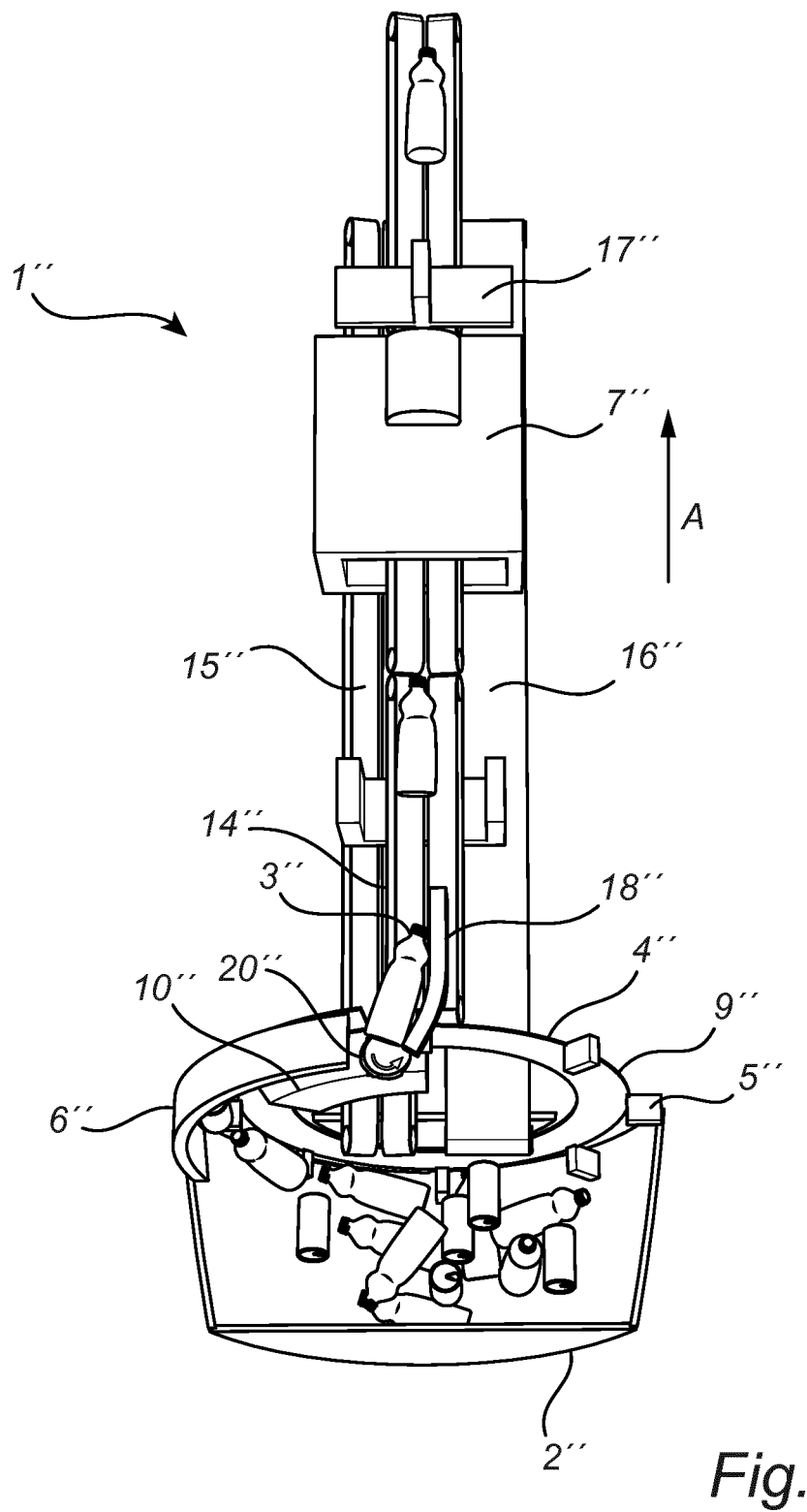

As seen in FIG. 3a and in FIG. 3b, the transporting device 4" may be arranged such that the first axis x of the transporting device 4" is substantially parallel with respect to a main transportation direction A of a container in the second receiving area 3" and/or third receiving area 14'.

Figure 17B:
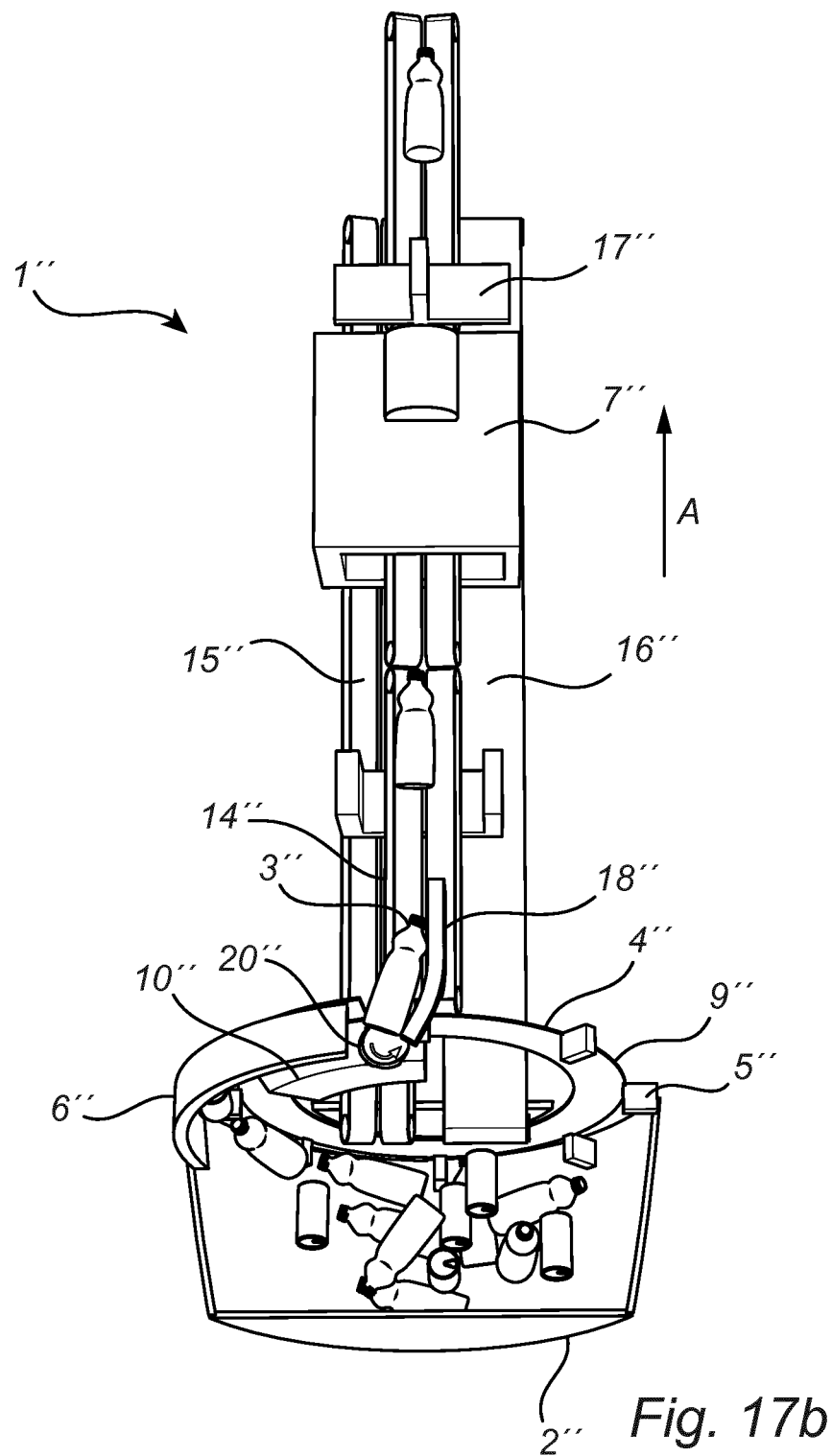

As shown in FIG. 3a and FIG. 3b (see also, FIGS. 17a-17b), the transporting device 4" may be provided as a frame 9'" with a central opening. Alternatively, it may be a solid plate as discussed above.

If the transporting device 4" is provided as a frame 9'", as shown in FIG. 3a and FIG. 3b, the transporting device 1" may be activated by a driving wheel (not shown) as described above.

Moreover, as seen in FIG. 3a and FIG. 3b, the elevating member 5" may be arranged such that at least a portion thereof extends radially outwards from the outer periphery of the transporting device 4". As an alternative the elevating member may be arranged as described above, i.e. that it extends radially inwards towards the center of the transporting device 4".

In FIG. 3a, two bottles that have just been singulated or picked-up are each in contact with a container supporting surface of a respective container elevating member.

The device 1" may have additional retaining means 10" for retaining a container being brought from the first receiving area 2" to the second receiving area 3". The retaining means 10" may be arranged radially inside the transporting device 4". The retaining means may be connected to an external frame of the device 1".

The retaining means 10" may extend at least along a portion of the path along which the container is brought between the first receiving area 2" and the second receiving area 3".

Optionally the device 1" may have a rotating plate or surface 20" arranged at the top of the transporting device 4" guiding a container to change travel direction of the container, forcing the container to leave the transporting device 4" and enter the second receiving area 3".

Such a rotating plate may be arranged on the retaining means 10".

The device 1" may be provided with further retaining means 18" extending along the second receiving area 3" and/or the third receiving area 14" in order to retain the containers and to prevent them from falling off the second receiving area 3" and/or third receiving area 14".

After being identified the container may be sorted by means of a propeller wheel 17".

The propeller wheel 17" may for example be arranged at or in near vicinity of the inspection means 7".

The arrangement of a propeller wheel for sorting of containers may be used also in the first and second embodiments of the device as discussed above.

The propeller wheel 17" may be rotatable clockwise or anti-clockwise. Hence, depending on the propelling direction the propeller wheel may forward a container either to a first conveyor belt 15" or to a second conveyor belt 16" arranged on either side of the device 1".

The conveyor belts 15" 16" may be arranged at a lower position in the vertical plane as compared to the second receiving area 3" and/or third receiving area 14".

The first conveyor belt 15" may extend such that it is arranged from the end of the inspection area 19" to the first receiving area 2", see FIG. 3a. The transport direction of a container travelling on the conveyor belt 15" and conveyor belt 16" may be the opposite as compared to the transport direction A of a container travelling on the second receiving area 3" and/or the third receiving area 14".

As seen in FIG. 3a and FIG. 3b, the conveyor belt 15" and conveyor belt 16" may be arranged through the center of the frame 9" of the transporting device 4" in the horizontal plane.

Hence, the first conveyor belt 15" may be arranged such that a container forwarded to the first conveyor belt may be transported back to the first receiving area 2". This may be useful if e.g. the inspection means 7" do not get a proper reading of the container and, hence, is not able to identify the container.

Hence, the second conveyor 16" belt may be arranged such that a container being forwarded to the second conveyor belt may be transported back through the transporting device 4" to the user of the device 1".

A fourth embodiment of the device 1''' will now be discussed with reference to FIGS. 4a-7. The device 1''' of the fourth embodiment differs from the device 1" in FIGS. 3a and 3b mainly in how the second receiving area is arranged in relation to the transporting device 4''' and in how the retaining means (6''', 10''', 2001) are arranged.

Figure 4A:
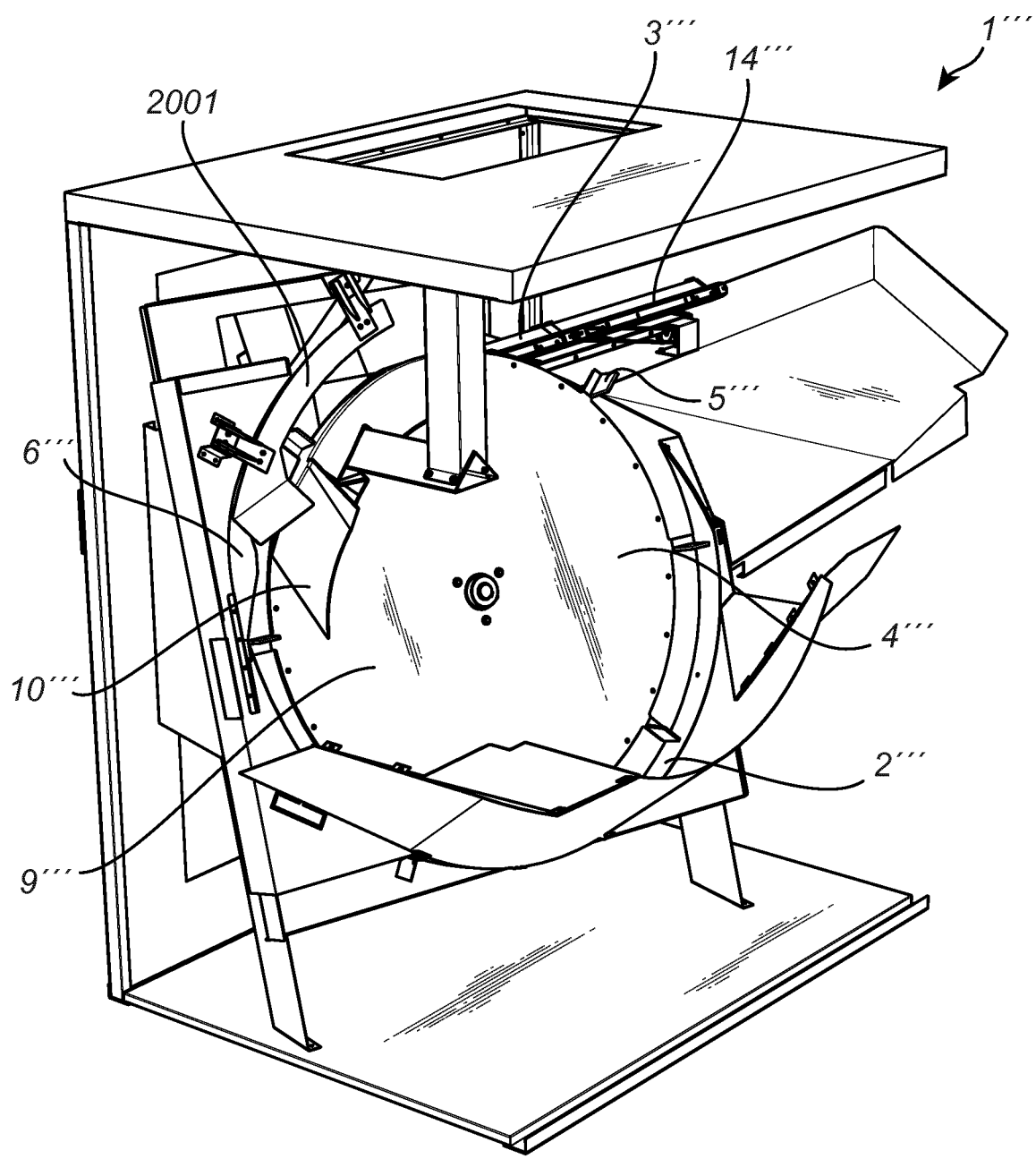
FIG. 4a is a perspective view of a fourth embodiment of the device for singulation of used food or beverage containers.

The device 1''' in FIG. 4a has a first receiving area 2''' into which the containers are collected after entering the device 1'''.

The device 1''' comprises a rotatable transporting device 4''' provided with elevating members 5''' for transporting containers from the first receiving area 2''' to a second receiving area 3'''. The transporting device 4''' in FIG. 4a is provided as a rotatable plate 9''', similar to that of the previous embodiments but lacking the through-hole of the third embodiment. Moreover, the elevating members 5m are arranged such that at least a portion thereof extends radially outwards from the outer periphery of the transporting device 4''', just as in the third embodiment of the invention. The elevating members 5''' move along and are locked to a circumferential path around a first axis x upon activation of the transporting device 4''', which first axis x is inclined at an angle $\alpha_4$ of approximately 20° relative the horizontal plane. This angle $\alpha_4$ is shown in FIG. 5b.

Figure 4B:
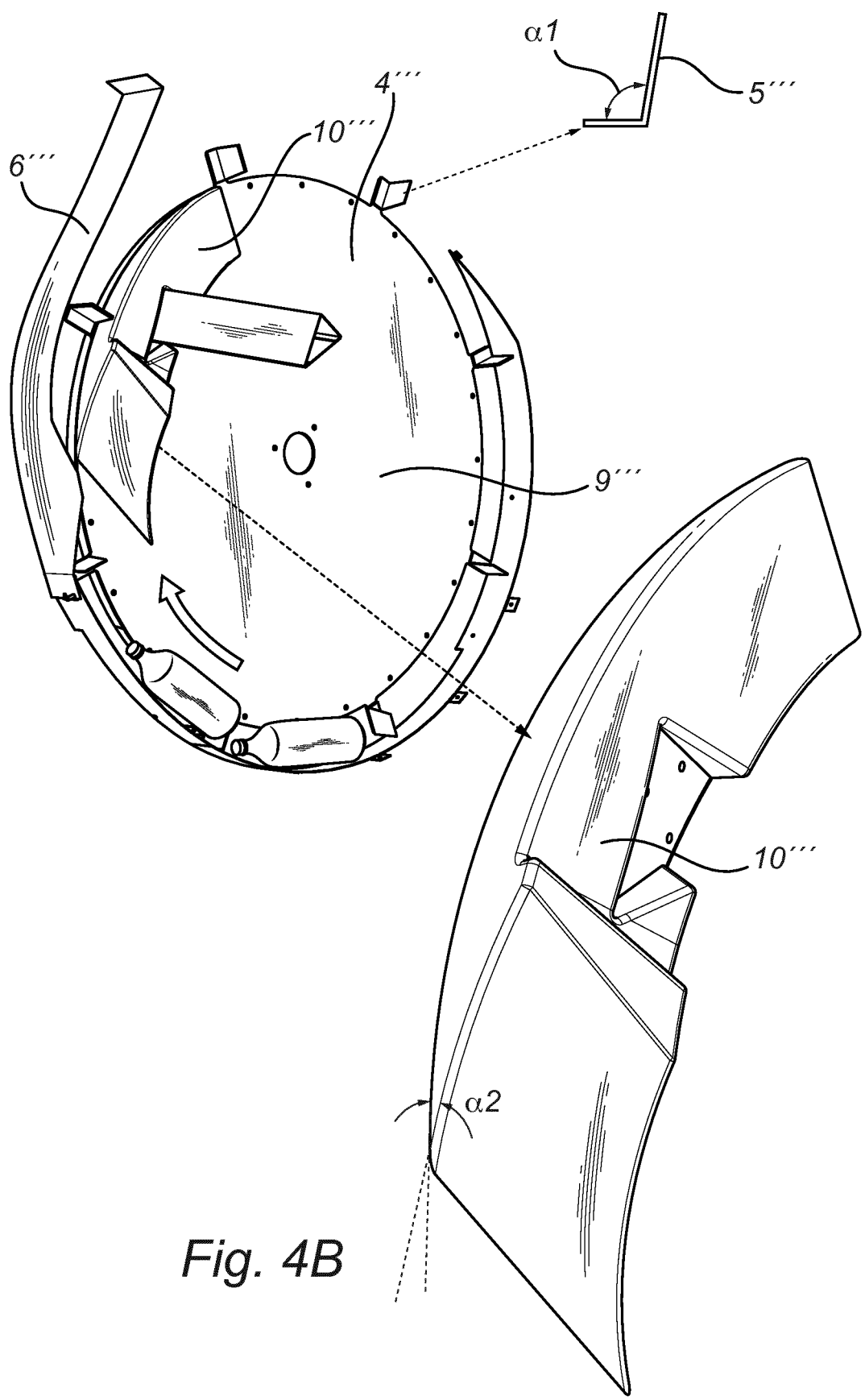
FIG. 4b is a perspective view of a section of the device of FIG. 4a, FIG. 5a is a top view of the device of FIG. 4a, showing the angle between the first axis and the main transportation direction of the containers.

Upon activation, here rotation, of the transporting device 4m, the elevating member 5''' randomly brings the containers, one by one, from the first receiving area 2''' to the second receiving area 3'''. This is shown in FIG. 4b. The container is elevated by the elevating member 5''' from the first receiving area 2''' by a scooping, pushing or nudging action.

When the container is at a predetermined vertical position, the so-called drop-off point, it leaves the container supporting surface of the elevating member 5''' of the transporting device 4''' and slides off by a sliding motion to the second receiving area 3''', herein embodied by a conveyor belt 14'''. Hence, the transport of the containers from the first receiving area 2''' to the second receiving area 3''' takes place mainly in the vertical plane.

The transporting device 4''' shown in FIG. 4a comprises 8 elevating members 5'''. The number of the elevating members 5''' depend on the size of the transporting device 4'''. The elevating members 5''' are equally spaced in the embodiment shown in FIG. 4a, and have a size and design adapted for bringing containers of different shapes and sizes collected in the first receiving area 2''' to the second receiving area 3'''.

As seen in FIG. 4a, the elevating members 5''' may extend radially from the outer periphery of the transporting device 4''' and away from the center of the rotatable plate 9''' of the transporting device 4'''.

In FIG. 4b, one bottle that has just been singulated or picked-up is in contact with a container supporting surface of a container elevating member 5'''. Another container which has not been picked up lies in the first receiving area 2''', waiting to be picked up by a container elevating member 5'''. The container elevating members 5''' are arranged at an angle $\alpha_1$ relative to the rotatable plate 9''', wherein this angle $\alpha_1$ is approximately 105°.

The device 1''' has retaining means 6''' arranged radially outwards of a portion of the circumference of the circumferential path of the container elevating members 5'''. The retaining means 6''' is flexibly connected to the device 1''' such that it may deflect radially outwards when a container larger than the space between the retaining means 6''' and the container elevating members is moved from the first receiving area 2''' to the second receiving area 3'''. This is clearly shown in FIG. 4b. This allows the retaining means 6''' to exert a constant pressure on the containers transported on the container elevating members 5''', thus helping to keep them in place. The retaining means 6''' may be fixedly connected to the device 1''' in one end 2002. As shown in FIG. 4b, the retaining means 6''' is fixedly connected to the device 1''' at a location halfway between the second receiving area 3''' and the first receiving area 2'''. In other words, using a standard 12-hour clock as a reference for the front surface of the rotatable plate 9''', the retaining means 6''' extends from about 9 o'clock on the rotatable plate 9''' to approximately 11 or 12 o'clock. The retaining means 6''' can be seen as a leaf spring configured to exert pressure on the containers as they are transported from the first receiving area 2''' to the second receiving area 3'''.

Figure 6A:
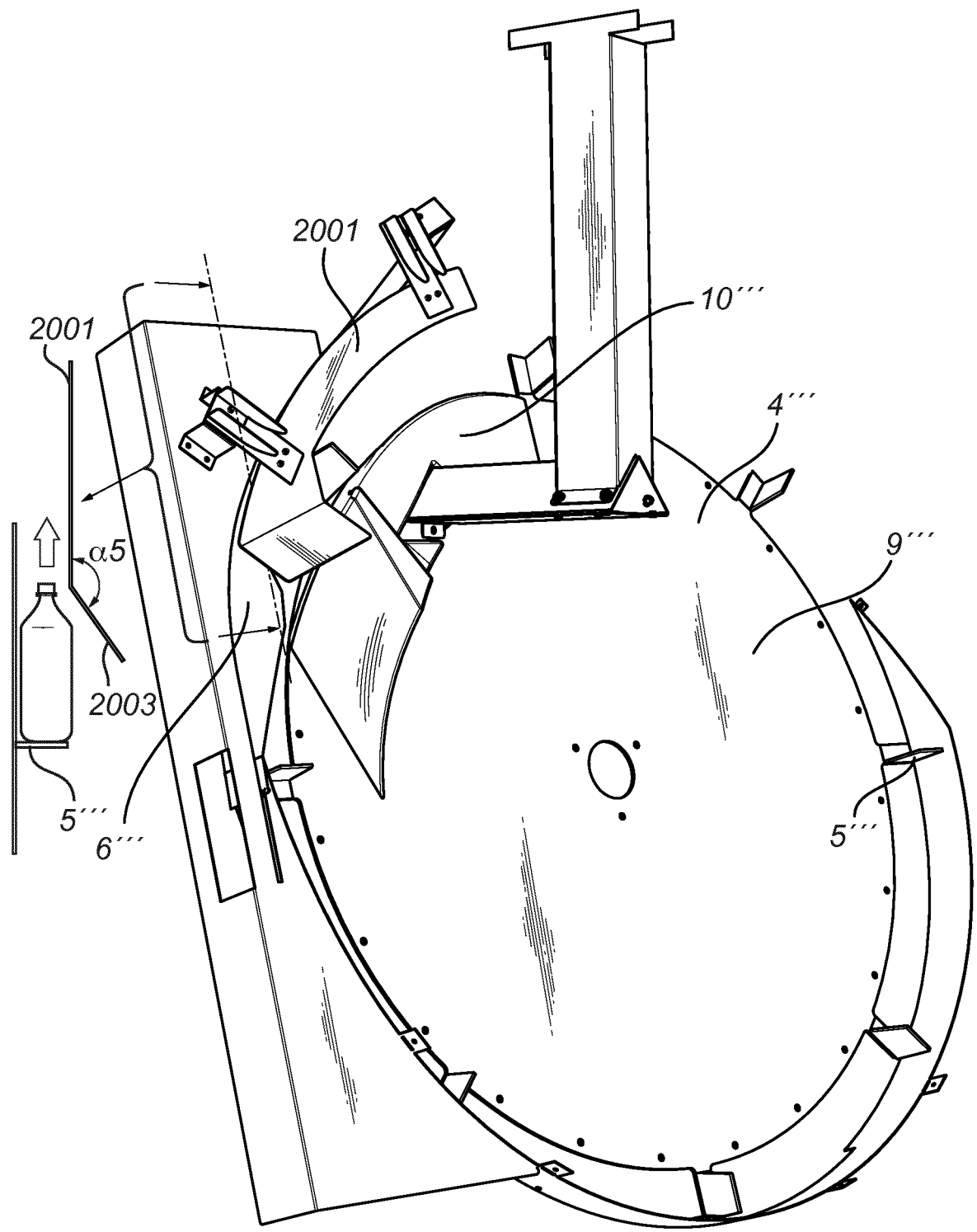
FIG. 6a is a perspective view of a section of the device of FIG. 4a showing the retaining means, the secondary retaining means, and the tertiary retaining means.

The device 1''' further comprises secondary retaining means 2001, not shown in FIG. 4b, arranged for retaining a container on the container elevating members 5''' while the container is being brought from the first receiving area 2''' to the second receiving area 3'''. The secondary retaining means 2001 is more clearly shown in FIG. 6a. The secondary retaining means 2001 is a barrier that is substantially parallel with the transporting device 4''', i.e. a wall offset from the transporting device 4'''. The wall or secondary retaining means 2001 is seen in FIG. 6a as being arranged at a distance from the transporting device 4''' such that a container may fit between the rotatable plate 9''' of the transporting device 4''' and the secondary retaining means 2001. Thus, the secondary retaining means 2001, in combination with the rotatable plate 9''' and the other retaining means 6''', 10''', forms a channel or passage through which the containers may pass as they move from the first receiving area 2''' to the second receiving area 3'''.

Figure 5A:
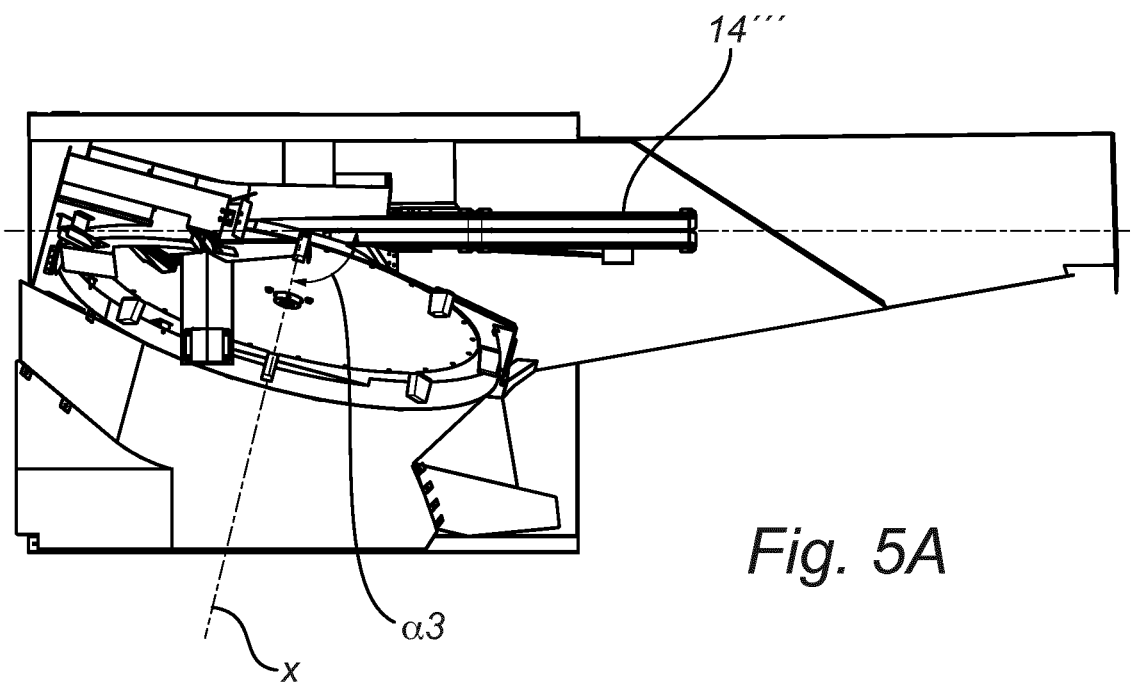
FIG. 5b is a side view of the device of FIG. 4a, showing the angle between the first axis and a horizontal plane.
Figure 5B:
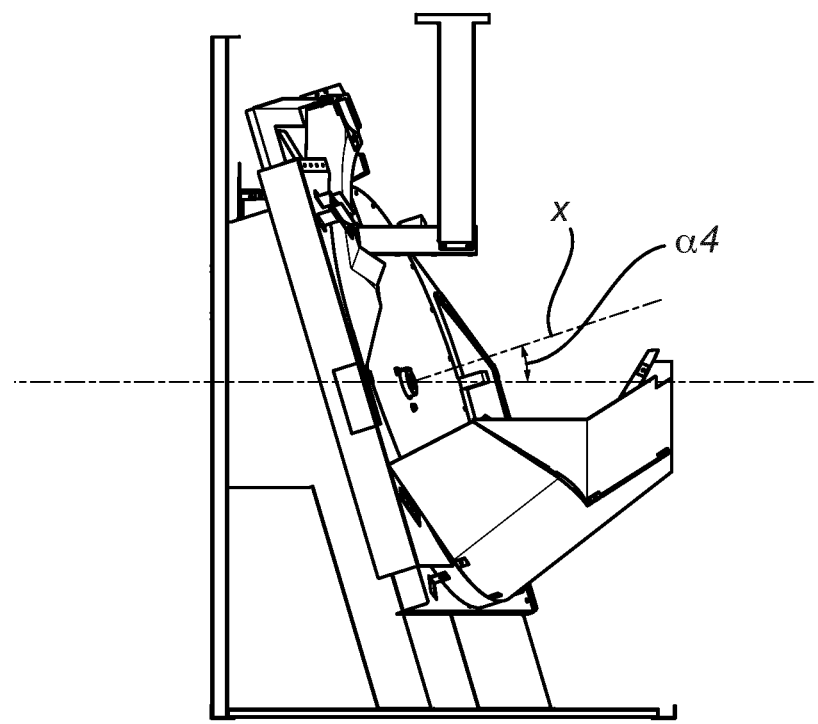

As seen in FIGS. 5a and 5b, the transporting device 4''' is arranged such that the first axis x of the transporting device 4''' is arranged at an angle $\alpha_3$ relative to a main transportation direction A of a container in the second receiving area 3'''. This angle is neither perpendicular, as in the first and second embodiment described above, nor parallel, as in the third embodiment described above. Instead, the first axis x is angled somewhere between, at an angle $\alpha_3$ of around 105° relative to the main transporting direction A of the container in the second receiving area 3'''.

Figure 6B:
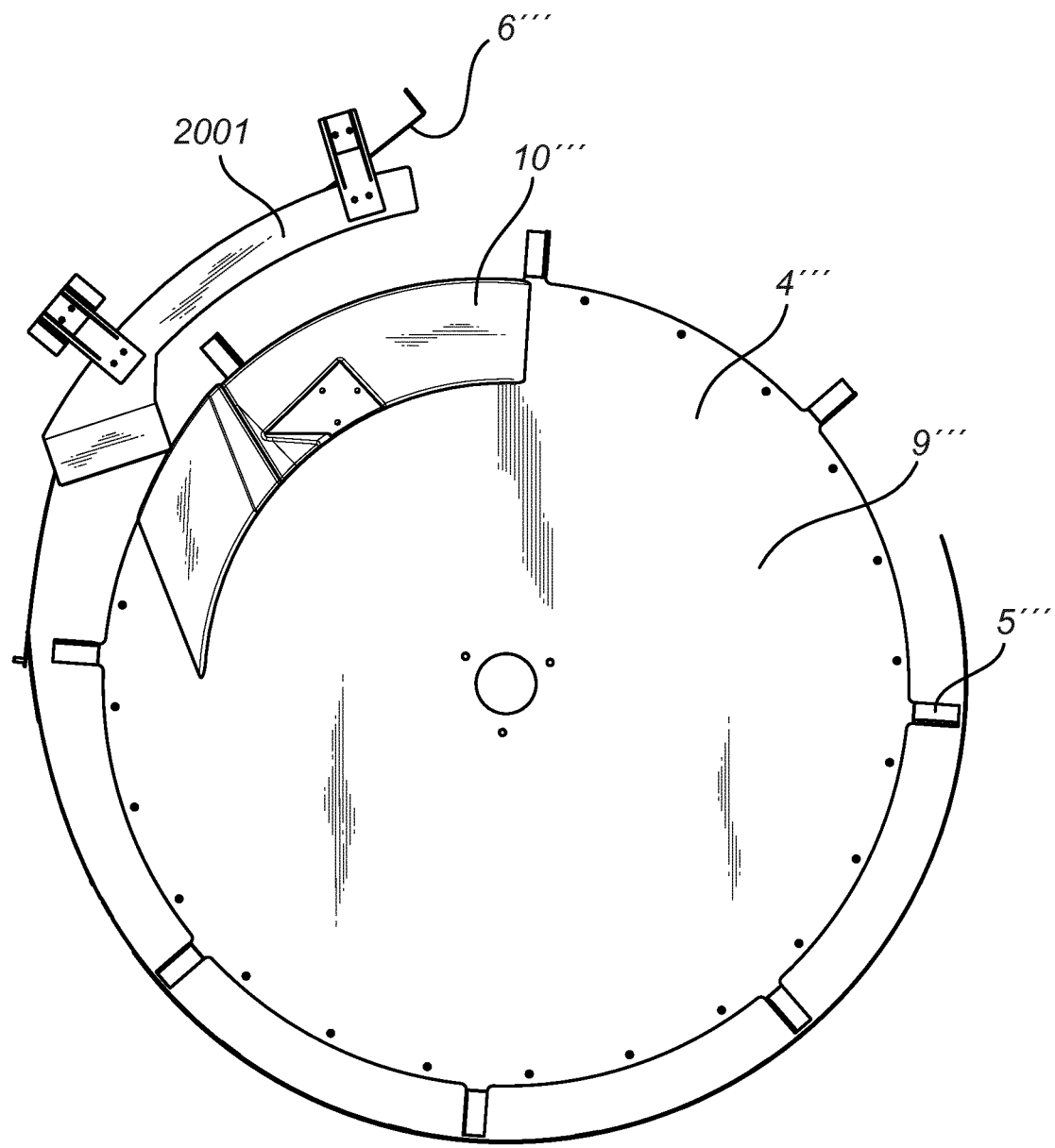
FIG. 6b is a side view of the rotatable plate of the device of FIG. 4a, as seen along the first axis.

As is seen in FIG. 6, the secondary retaining means 2001 is flexibly connected to the device 1''' by means of two flexible connection means, i.e. two leaf springs, such that the secondary retaining means 2001 may deflect in a direction that is substantially parallel with the first axis x. This is to be understood as meaning that the distance between the secondary retaining means 2001 and the rotatable plate 9''' of the transporting device 4''' may be increased by a container passing therebetween, thus causing the secondary retaining means 2001 to flexibly deflect outwards and away from the transporting device 4'''. Just as the secondary retaining means 2001 is caused to flexibly deflect away from the transporting device 4''', it also pushes back against the containers, thus holding them in place on the container elevating members 5'''. Additionally, the secondary retaining means 2001 comprises a guiding flange 2003. The guiding flange 2003 is a portion of the secondary retaining means 2001 that protrudes away from the transporting device 4''' at an angle $\alpha_5$ relative to the remainder of the secondary retaining means 2001. This angle $\alpha_5$ is approximately 135°, and this helps align containers that are slightly misaligned with the circumferential path of the container elevating members 5'''. This also ensures that the containers are held in place on the container elevating members 5''' as they are transported from the first receiving area 2''' to the second receiving area 3'''. Finally, as is seen in FIG. 6b, the secondary retaining means 2001 extend from a position proximal to the drop-off point of the containers, to a position slightly less than halfway between the first receiving area and the drop-off point. In other words, the secondary retaining means 2001 extends from 12 o'clock on the rotatable plate 9''' to approximately 10 o'clock.

The device 1''' also has tertiary retaining means 10''' for retaining a container being brought from the first receiving area 2''' to the second receiving area 3'''. The tertiary retaining means 10''' is arranged radially inwards of the circumferential path of the container elevating members 5'''. Furthermore, the tertiary retaining means 10''' comprises a container supporting surface proximal to an uppermost portion of the transporting device 4''' and which surface is facing radially outwards. Thus, containers elevated by the container elevating members 5''' may rest on a container supporting surface of the tertiary retaining means 10''' as they are transported from the first receiving area 2''' to the second receiving area 3'''. The tertiary retaining means 10''' is fixedly connected to the device 1''' by means of an arm extending in a direction substantially parallel with a horizontal projection of the first axis x.

The tertiary retaining means 10''' extends along a portion of the circumferential path along which the container is brought between the first receiving area 2''' and the second receiving area 3'''. Specifically, the tertiary retaining means 10''' extends along approximately 20% of the circumference of the rotatable plate 9'''. The extension of the tertiary retaining means 10''' is measured as a percentage of a 360° circle centered around the first axis x. One end of the tertiary retaining means 10''' is located at a position proximal to the container drop-off point, i.e. at a position proximal to 12 o'clock on the rotatable plate 9'''. In other words, the tertiary retaining means 10''' extends from an upper portion of the rotatable plate 9''' and down towards the first receiving area 2'''.

The tertiary retaining means 10''' further comprises a wedge-shaped portion arranged to deflect containers from the container supporting surface of the elevating members 5''' if the containers are misaligned thereon. This wedge-shaped portion tapers off in a circumferential direction towards the first receiving area 2'''. In other words, the wedge-shaped portion points towards the first receiving area 2'''. The wedge-shaped portion of the tertiary retaining means 10''' tapers both in a radial direction and in an axial direction, thus ending in a point at a position at approximately 9 o'clock on the rotatable plate 9'''. As seen in FIG. 4b, the wedge-shaped portion tapers off at an angle $\alpha_2$ of approximately 20°.

Looking at FIG. 7, it is shown that the device 1''' has a flange that is fixedly connected to the circumference of the rotatable plate 9''' and which flange extends towards the second receiving area 3'''. The second receiving area 3''' is located behind the rotatable plate 9'''. In other words, the flange extends from an outer periphery of the rotatable plate 9''' and backwards, beyond the back surface of the rotatable plate 9'''. The flange is arranged to guide a container as it moves from resting on the container elevating elements 5''' to sliding onto the second receiving area 3'''. As the flange extends backwards from the rotatable plate 9''', it acts as a bridging surface between the container elevating members 5''' and the second receiving area 3'''. Thus, the risk of containers or other objects falling down behind the rotatable plate 9''' as the containers are transported from the container elevating members 5m to the second receiving area 3''' is reduced. The flange is arranged at an angle $\alpha_6$ relative to the rotatable plate 9''', wherein this angle $\alpha_5$ is approximately 80°. Thus, the containers are caused to slide across the flange and down towards the second receiving area 3''' and the conveyor belt 13m once the container elevating members 5''' reach a container drop-off point.

The device 1''' further comprises a V-conveyor 14''', i.e. a conveyor belt. The second receiving area comprises one end of this conveyor belt 14''', the conveyor belt 14''' being arranged at an angle relative to a horizontal projection of the first axis x. This angle is approximately 105°. Thus, the conveyor belt 14''' extends from the second receiving area 3m and backwards, away from the front of the device 1''' and the user.

The conveyor belt 14''' is a V-conveyor, and comprises two belts. One belt, the one that is located closest to the rotatable plate 9''', is shorter than the other belt. This means that the conveyor belt 14''' may be arranged closer to the rotatable plate 9''' than what would have been possible if the two belts had been equally long. As the conveyor belt 14m is arranged at an angle relative the rotatable plate 9''', having one band offset the other allows the conveyor belt 14m to be arranged closer to the transporting device. Thus, the amount of non-active bridging surfaces between the rotatable plate 9m and the second receiving area 3''' is reduced.

The conveyor belt 14''' has a width that is approximately 65-70 mm, as measured in a direction that is perpendicular to a transporting direction of the conveyor belt 14''' and that is parallel with the horizontal plane. This enables misaligned containers to more easily fall off the conveyor belt 14''' on their own, without being forced to do so by means of e.g. a sorting device or sorting arrangement, Thus, a more efficient sorting of misaligned containers is achieved. Finally, the two belts of the conveyor belt 14''' are arranged at an angle relative to each other. This angle is approximately 50°.

Subsequent to the second receiving area 3''', there is located an inspection area and a sorting station (not shown). Said inspection area may comprise inspection means for identifying a container, as is described in relation to any of the previous embodiments. Said sorting station may comprise pneumatic sorting means, such that after being identified by the inspection means, arranged along the direction of travel of the conveyor belt 14''', the container may be sorted at a sorting station. This sorting station comprises a pneumatic sorter that is arranged after the inspection means, as seen in the direction of travel of the conveyor belt 14'''. The pneumatic sorter is arranged to push invalid containers off the conveyor belt 14''' by means of small bursts of gas. The sorting station may alternatively be of the type discussed in relation to the first, second or third embodiment of the invention.

Figure 8:
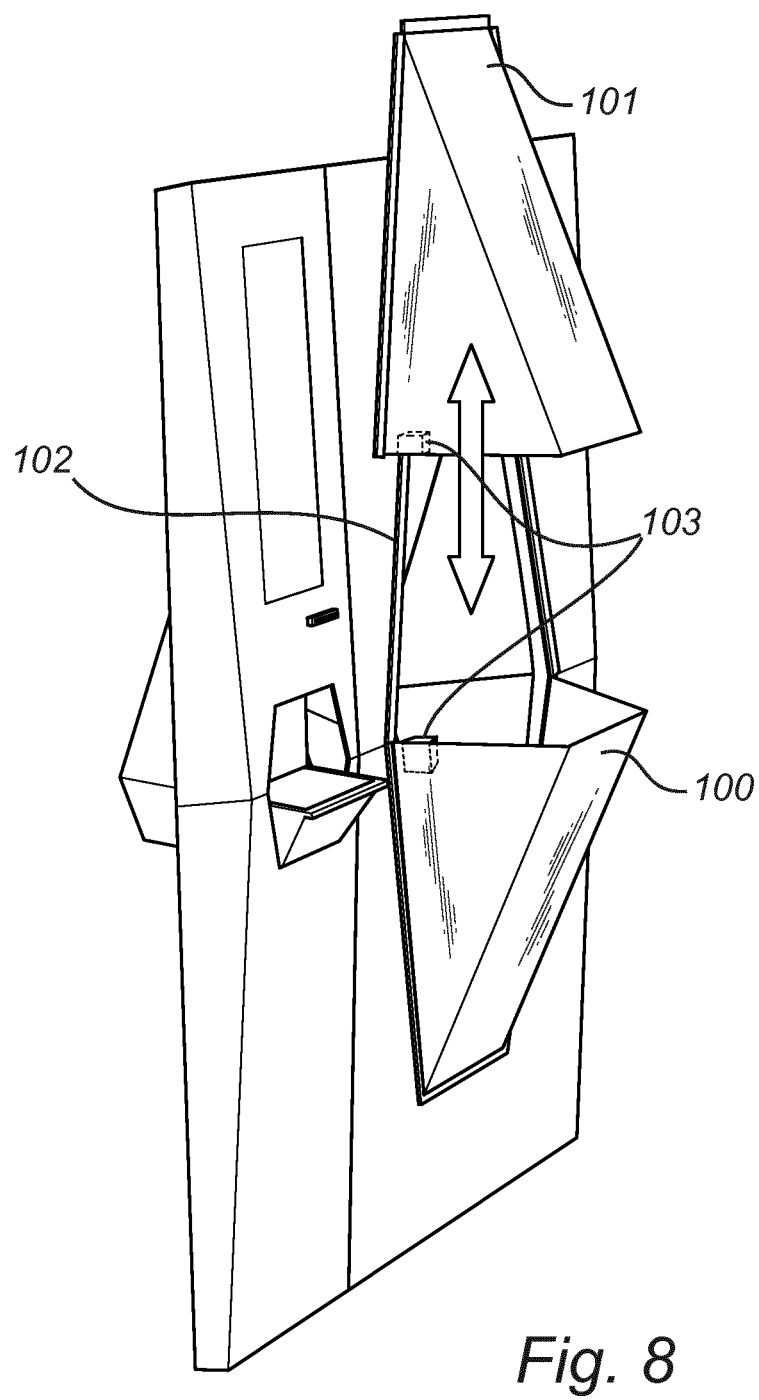
FIG. 8 is a perspective view of a front of a reverse vending machine comprising a closing device according to one exemplary embodiment of a fifth aspect of the present inventive concept, wherein said closing device is in an open state.

FIG. 8 is a perspective view of a front of a reverse vending machine comprising a closing device according to one exemplary embodiment of a fifth aspect of the present inventive concept, wherein the closing device is in an open state. The fifth aspect of the present inventive concept may be used with any type of bulk sorting reverse vending machine or vending machine comprising means for bulk sorting.

Figure 10:
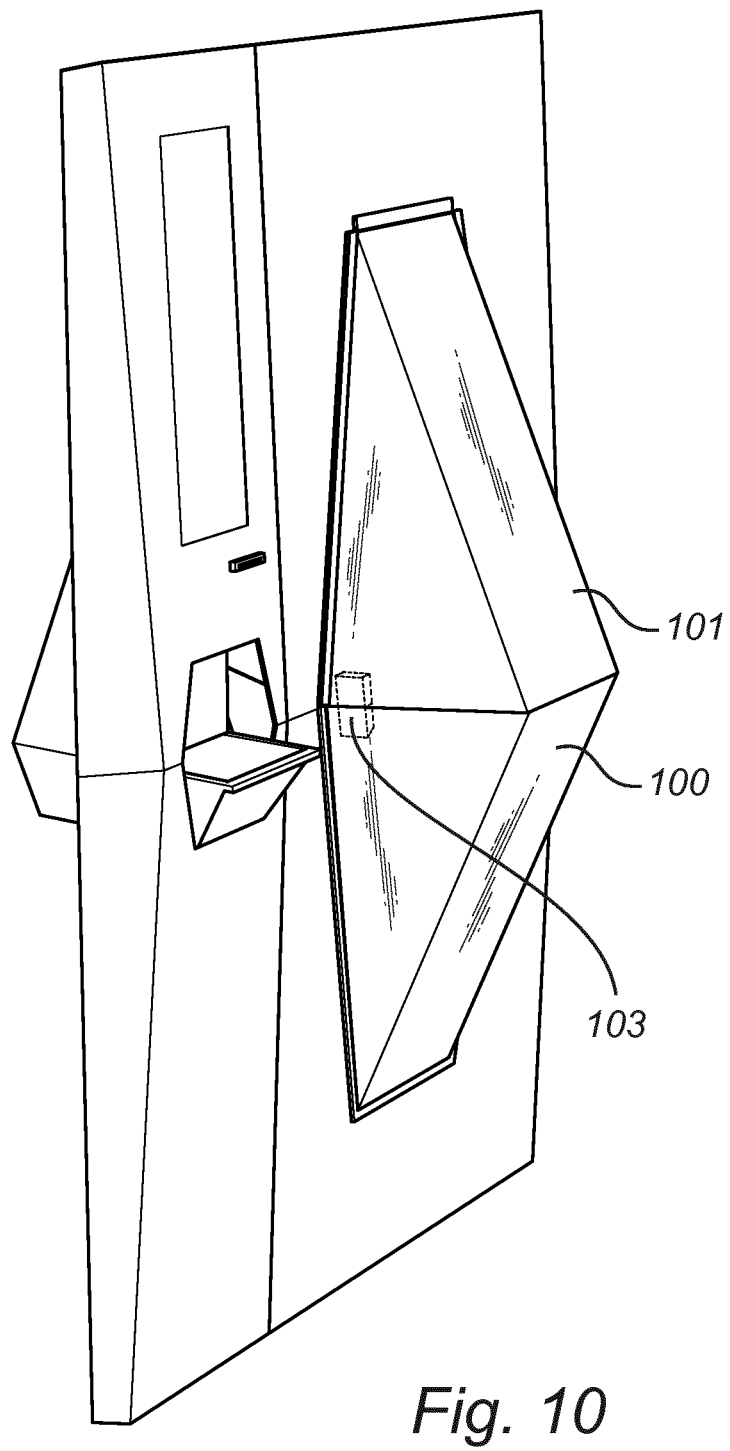
FIG. 10 is a perspective view of a front of a reverse vending machine comprising a closing device according to another exemplary embodiment of the fifth aspect of the present inventive concept, wherein said closing device is in a closed state.

The reverse vending machine 1 of FIGS. 8 and 10 comprises:

a first receiving area arranged for simultaneously receiving and keeping a plurality of containers which are to be singulated;

a first singulation transporting device comprising a container singulator, which also may be referred to as elevating member, for transporting individual containers from the first receiving area to a second receiving area, a second transporting device for transporting individual containers from the second receiving area to an inspection station, where the validity of the container is determined, and a front comprising an in-feed 100 for guiding a bulk of containers towards the first receiving area, wherein the front further comprises:

a movable closing device 101 for closing the in-feed, which closing device is movable between an open state wherein the in-feed is open, and a closed state wherein the in-feed is closed, automatic locking device configured to lock the movable closing device in the closed state at the start of a container singulation session, and unlock the movable closing device at the end of the container singulation session.

Figure 9:
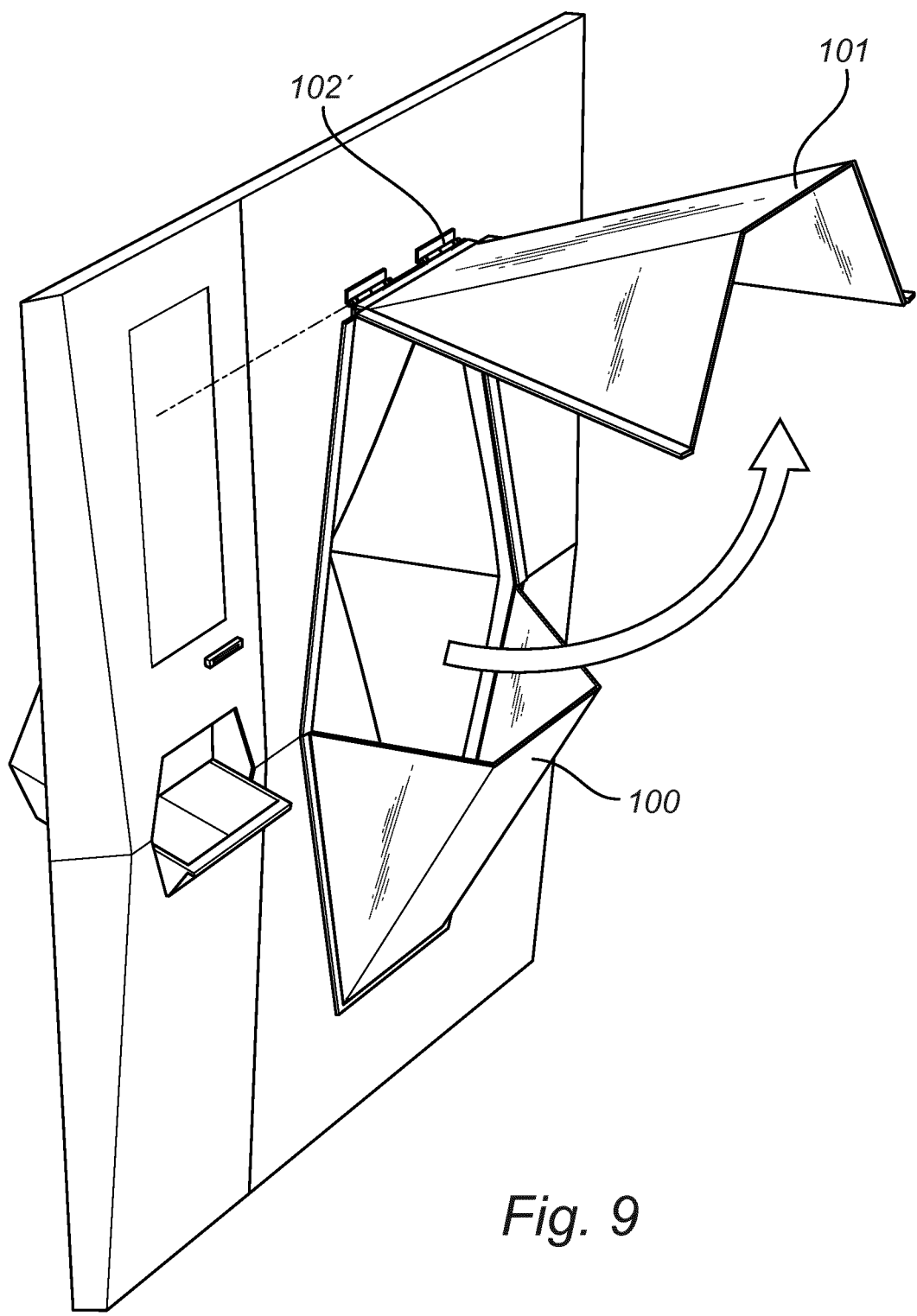
FIG. 9 is a perspective view of a front of a reverse vending machine comprising a closing device according to another exemplary embodiment of the fifth aspect of the present inventive concept, wherein said closing device is in an open state.

In FIG. 8 the movable closing device is arranged in the open state, and in FIG. 10 the movable closing device is arranged in the closed state. As can be seen in FIGS. 8 and 9 the movable closing device is arranged up stream of the in-feed, and is moved between the open and closed state by a translating non-rotational movement following the outside surface of the front. The direction of motion of the movable closing device is controlled by guides 102 attached to the front of the reverse vending machine; to which guides the movable closing device is attached.

The size of the opening of the in-feed may be adapted to allow containers of different sizes and shapes to enter into the device 1 and to fulfill the requirements of the safety standard NS-EN 349:1992+A1:2008.

Moreover, the distance between the opening and the singulation transporting device may be adapted to fulfill the requirement of the standard, ISO 13857:2008, Safety of machines.

According to a further safety standard, ISO 13857:2008 of machines, the opening should comprise different safety arrangement for preventing injuries. For example, it can comprise a light curtain with a light beam which functions such that, when the device 1 is running, the device is immediately shut down when the light beam is broken.

The infeed may comprise a tray which may be slightly tilted with respect to the horizontal plane in order to facilitate the containers to be forwarded to the first receiving area.

The infeed 100 may be made of a plastic material, metal and/or wood.

The infeed 100 may further comprise rims on both sides in order to retain the containers being forwarded towards the first receiving area and to prevent the containers from falling off the infeed upon being forwarded to the first receiving area.

The tray may be provided with slits in order to handle loose objects, e.g. pieces of paper such as labels from containers, into which the loose objects can fall.

Loose objects may fall onto a steep surface located below the infeed and be guided directly or via a funnel to a trash collector.

The trash collector may, but need not, be the same as the trash collector or containers discussed above.

The infeed may further comprise a conveyor belt in order to further facilitate transport of the containers from the tray towards the first receiving area. The conveyer belt may be arranged between the tray and the first receiving area of the device 1 and hence being adapted to the size of the infeed and the opening of the device.

Such a conveyor belt may comprise rims on both sides in the longitudinal direction in order to prevent the objects from falling off from the conveyor and to retain the containers towards the first receiving area.

The conveyor belt may be positioned substantially horizontal with respect to the horizontal plane.

Alternatively, the infeed may comprise solely a tray or solely a conveyor belt.

FIG. 9 is a perspective view of a front of a reverse vending machine illustrating an alternative embodiment in the open state. This embodiment is equal to the one shown in FIGS. 8 and 10, except that the movable closing device is attached to the front by means of hinges, to that the movable closing device may be rotated between an open and closed state. In the closed state the position of the movable closing device is equal to the one illustrated in FIG. 10.

Figure 11:
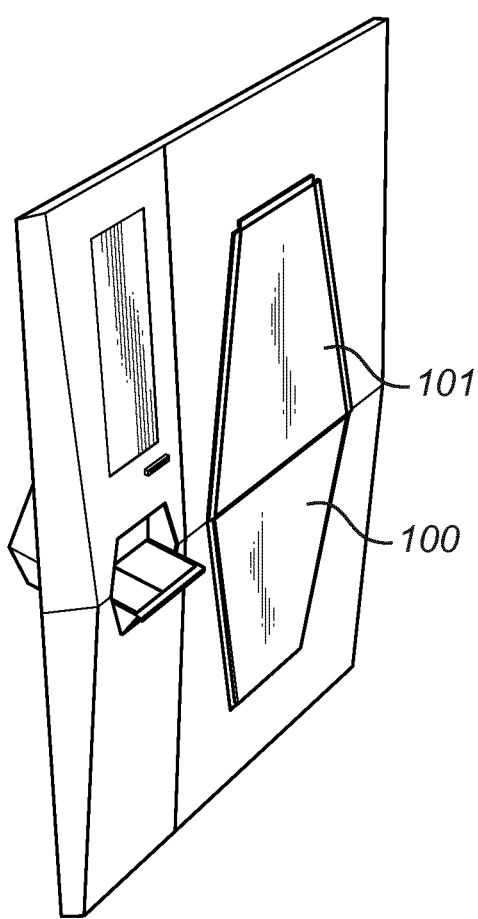
FIGS. 11 and 12 are a perspective views of a front of a reverse vending machine comprising a closing device according to another exemplary embodiment of the fifth aspect of the present inventive concept, wherein said closing device is in a closed state and an open state, respectively.
Figure 12:
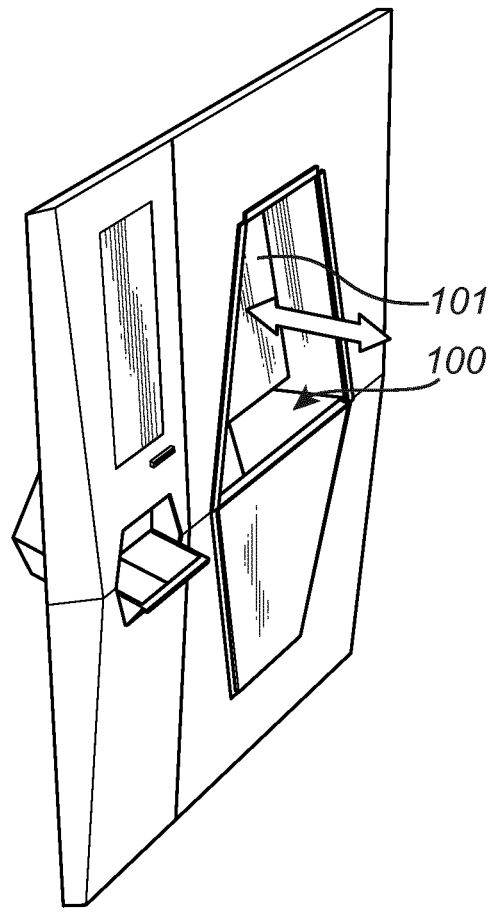

FIG. 12 is a perspective view of a front of a reverse vending machine illustrating an alternative embodiment in the open state. This embodiment is equal to the one shown in FIGS. 8 and 10, except that the movable closing device is moved between the open and closed state by a translating non-rotational movement, which movement follows a direction transverse or orthogonal to the front surface of the machine as illustrated by the double arrows. FIG. 11 shows this movable closing device in the closed state.

Figure 13:
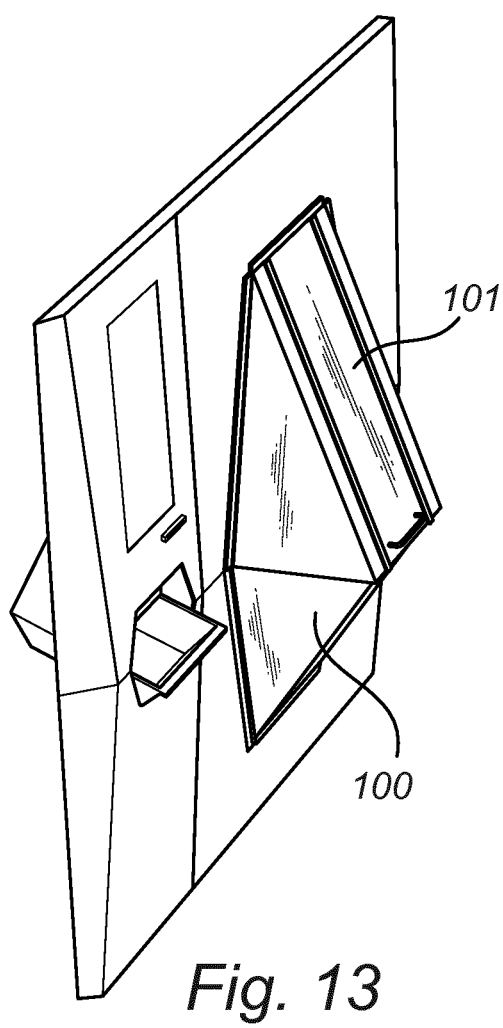
FIGS. 13 and 14 are a perspective views of a front of a reverse vending machine comprising a closing device according to another exemplary embodiment of the fifth aspect of the present inventive concept, wherein said closing device is in a closed state and an open state, respectively.
Figure 14:
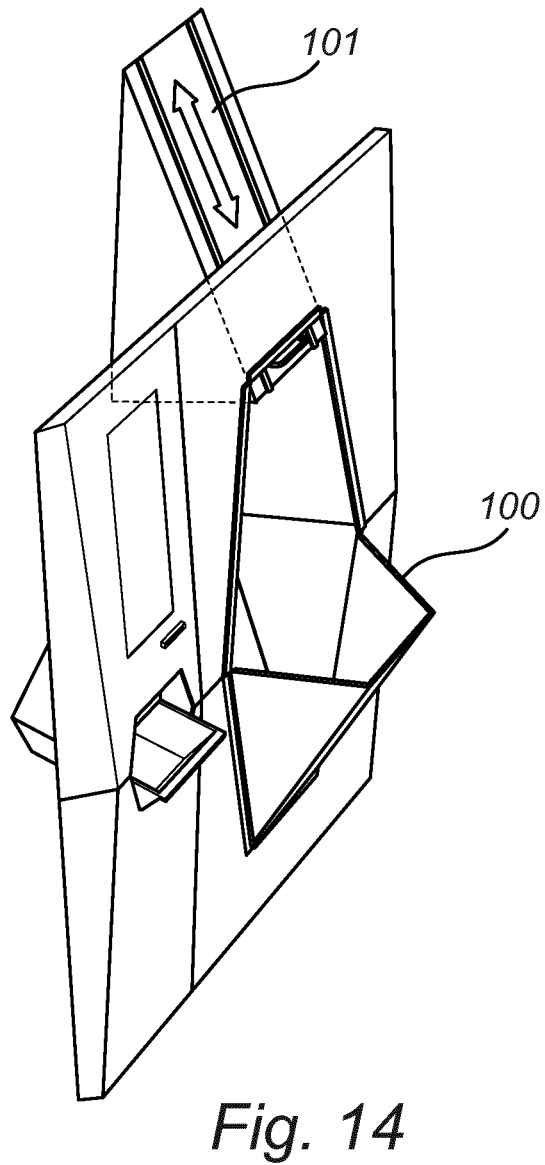

FIG. 14 is a perspective view of a front of a reverse vending machine illustrating an alternative embodiment in the open state. This embodiment is equal to the one shown in FIGS. 8 and 10, except that the movable closing device is moved between the open and closed state by a translating non-rotational movement, which movement follows a direction transverse or to the front surface of the machine as illustrated by the double arrows. The direction of motion crosses the front surface of the machine at an angle between 5° and 80°, or between 10° and 60°. FIG. 13 shows this movable closing device in the closed state.

In the embodiments illustrated in FIGS. 8-14 the movable closing device is arranged up stream of the infeed.

Figure 15:
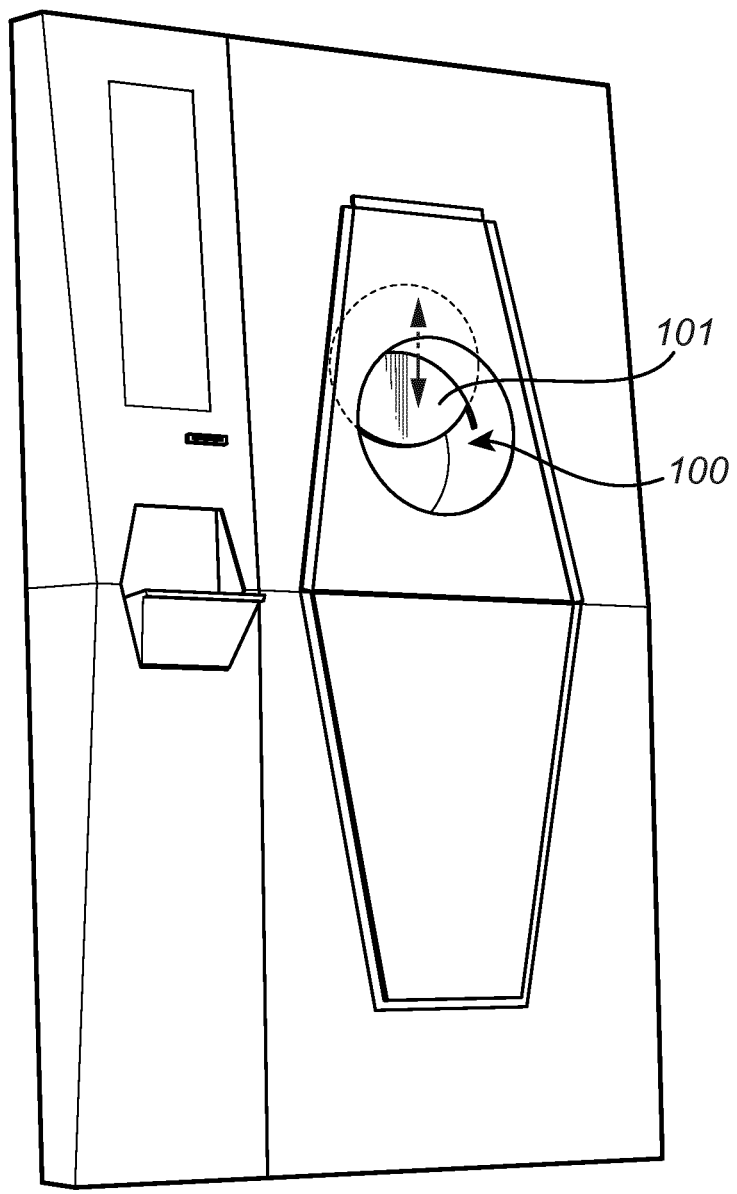
FIG. 15 is a perspective view of a front of a reverse vending machine comprising a closing device according to another exemplary embodiment of the fifth aspect of the present inventive concept, wherein said closing device is in an intermediate state.

FIG. 15 is a perspective view of a front of a reverse vending machine illustrating an alternative embodiment in an intermediate state, i.e. in a state between the open state and the closed state. This embodiment is equal to the one shown in FIGS. 8 and 10, except that the movable closing device is flat and arranged within the infeed of the device; i.e. it is arranged downstream of the opening of the infeed and up-stream of the end of the in-feed. The movable closing device is moved between the open and closed state by a translating non-rotational movement, which movement may follow a direction parallel to the front surface of the machine as illustrated by the double arrows. When the movable closing device is arranged in the closed state, it fully covers the passage formed by the infeed.

Figure 16:
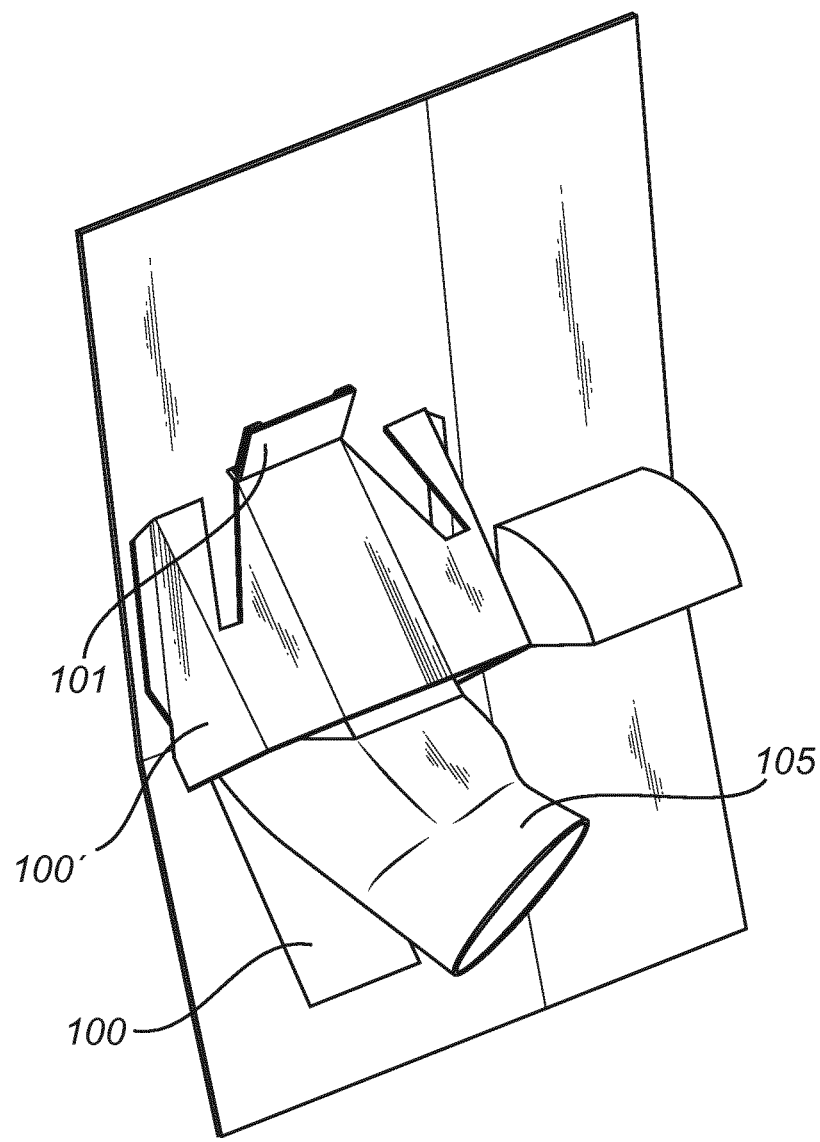
FIG. 16 is a perspective view of a front of a reverse vending machine comprising a closing device according to one exemplary embodiment of the fifth aspect of the present inventive concept, as seen from the back.

FIG. 16 is a perspective view of the front illustrated in FIGS. 13 and 14, as seen from the back of the front. Here an optional funnel is provided, for guiding the containers towards the first receiving area. Moreover, an optional back of the infeed 100' is shown.

Figure 18:
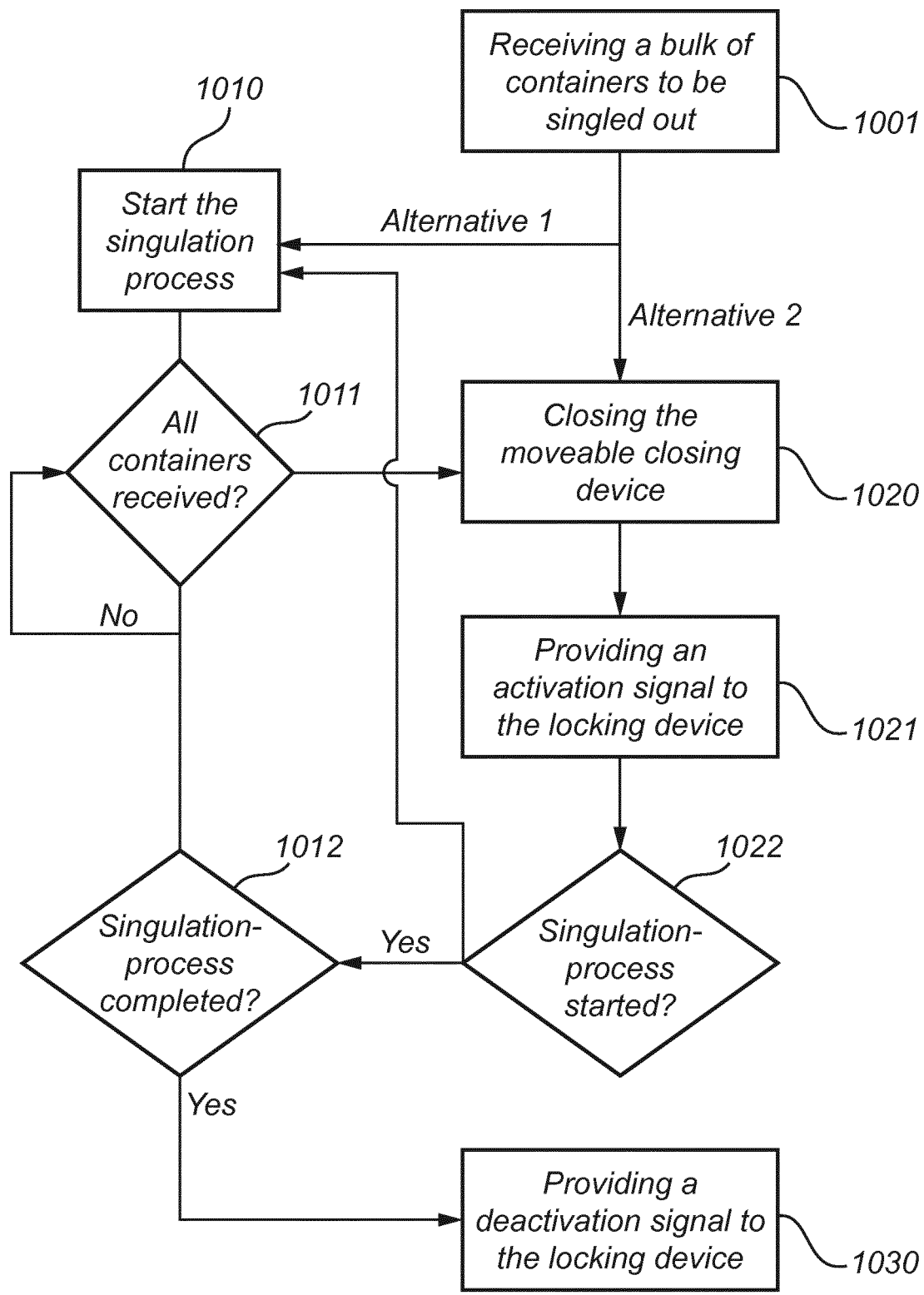
FIG. 18 illustrates one exemplifying sequence of steps that may be used for controlling the in-feed of the reverse vending machine in accordance with one aspect of the inventive concept.

FIG. 18 illustrates one exemplifying sequence of steps that may be used for controlling the in-feed of the reverse vending machine in accordance with the invention. First a bulk of objects are received through the in-feed of the reverse vending machine, 1001. Thereafter the singulation process is started, 1010, or the movable closing device is closed and locked, 1020. That the singulation process is started before the closing of the movable closing device enables for the user to enter so many containers that a predetermined fill-level of the machine is reached and no more containers can or should be inserted (e.g. because the machine signals that to the user), await that some of the containers provided to the machine are processed so that the fill-level of the machine decreases, whereafter the user may add more containers into the machine. When the user has provided all his/her containers into the machine, 1011, the movable closing device is closed (manually or automatically), 1020, and automatically locked, 1021, so that the user may leave the machine while the machine continues to process the containers. Once the singulation process has been completed, 1012, the moveable closing device is unlocked.

Alternatively, the movable closing device is closed and optionally locked, 1020 and 1021, before, or at the same time as, the singulation process starts, 1010, this has the advantage that the user is protected from injuries caused by moving parts inside the machine, which parts are active at the singulation process; it also has the advantage of reducing noise caused by the singulation process during the whole singulation process.

According to one exemplifying embodiment, the in-feed is open in the idle state, i.e. when the machine is waiting for a new user. Alternatively, the in-feed is closed in the idle state.

According to one method of operating a reverse vending machine for singulation of used beverage or food containers received in bulk into individual objects, the method comprising the steps of:

providing a reverse vending machine having a first receiving area arranged for simultaneously receiving and keeping a plurality of containers which are to be singulated; an in-feed; a first singulation transporting device for individual transporting of containers from a first receiving area to a second receiving area; a movable closing device for closing the in-feed, which closing device is movable between an open state wherein the in-feed is open, and a closed state wherein the in-feed is closed;

receiving a bulk of used beverage or food containers through the infeed;

receiving and keeping the bulk of used beverage or food containers at the a first receiving area;

individual transporting of containers from the first receiving area to a second receiving area, protecting the user of the reverse vending machine, wherein the step of protecting the user comprises the steps of:

providing an automatic locking device, providing an activation signal to the automatic locking device when the moveable closing device is to be locked, which activation signal is issued based on one or two or all of the following: the number of objects received at the first receiving area, the rate at which containers or objects are received at the first receiving area, the position of the movable closing device, providing a deactivation signal to the automatic locking device when the moveable closing device is to be unlocked, which activation signal is issued based on one or both of the following: the number of objects or containers present in the first receiving area, and the container transportation rate from the first receiving area to the second receiving area, or comprises the step of:

preventing a start of the individual transporting of containers from the first receiving area to a second receiving area while the moveable closing device is in an open state, or comprises the step of:

halting the first singulation transporting device and discontinuing the individual transporting of containers from the first receiving area to a second receiving area in response to a movement of the movable closing device to an open state.

The step of receiving and keeping the bulk of used beverage or food containers at the first receiving area may further comprises the step of continuously single out individual containers from the bulk of containers in the first receiving area, and transporting the individual container from the first receiving area to a second receiving area which second receiving area is arranged at a higher vertical level.

Figure 19:
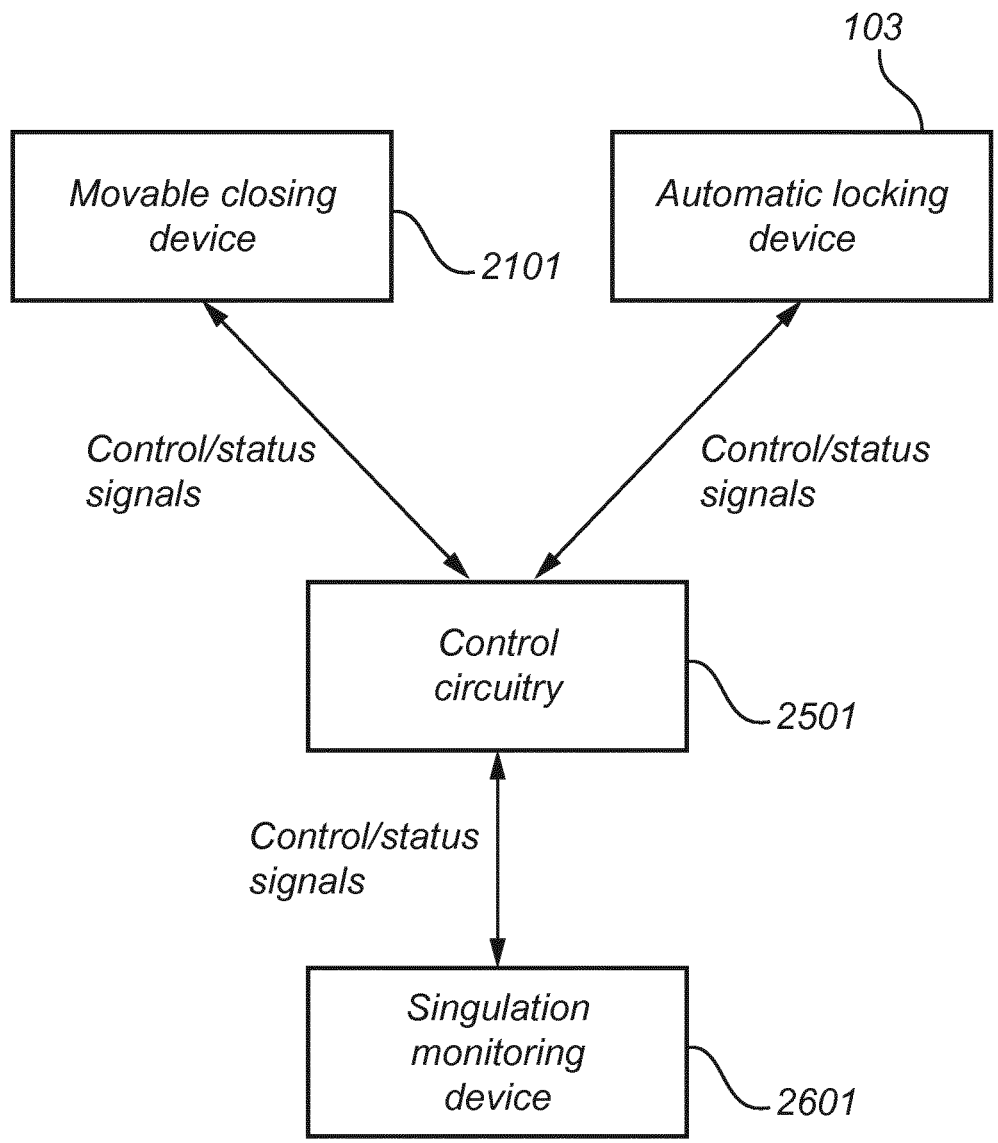
FIG. 19 illustrates one example of how a signal may be directed in a reverse vending machine according one aspect of the inventive concept.

FIG. 19 illustrates one example of how a signal may be directed in a reverse vending machine according to the invention. Here, a singulation monitoring device 2605, which may inform a control circuitry 2501 about e.g. the fill level of the machine or the first receiving area, the amount of objects received at the first receiving area, the rate at which containers or objects are received at the first receiving area, the position of the movable closing device, the amount of objects or containers present in the first receiving area and/or the container transportation rate from the first receiving area to the second receiving area. Based on this information the control circuitry 2501 may issue a closing signal which is sent to the moveable closing device 2101, whereupon the movable closing device is closed automatically, i.e. non-manually. Additionally or alternatively, the control circuitry may issue an opening signal which is sent to the moveable closing device, whereupon the movable closing device is opened automatically, i.e. non-manually. Additionally or alternatively, based on this information the control circuitry may issue an activation signal which is sent to the automatic locking device 103, whereupon the automatic locking device 103 locks the movable closing device in the closed state. Additionally or alternatively, the control circuitry may issue a deactivation signal which is sent to the automatic locking device 103, whereupon the automatic locking device 103 unlocks the movable closing device. Additionally or alternatively, the control circuitry may issue a signal to the first singulation transporting device when the movable closing device is open. Thereby, the first transporting device may be prevented from starting the individual transporting of containers from the first receiving area to the second receiving area. Additionally or alternatively, during operation of the reverse vending machine, the control circuitry may issue a signal to the first singulation transporting device if the movable closing device is opened. Thereby, the first singulation transporting device may be halted and the individual transporting of containers from the first receiving area to the second receiving area may be discontinued.

The invention has been described with reference to some detailed examples, however the skilled person realizes that a number of modifications of the embodiments described herein are possible without departing from the scope of the invention, which is defined in the appended claims. For example, the design of the transportation device including the container elevating members may be scaled or given different designs depending on e.g. the material, size, shape and weight of the containers that the singulation device is to be able to handle. Guided by this description and possibly in combination with some testing the person skilled in the art will be able to find a suitable design. Furthermore, the reverse vending machine of the present inventive concept may have an alternative configuration and may e.g. comprise alternative means for singulating used beverage or food containers, such as those disclosed in US2012118700 or EP2014/052546. When using the reverse vending machine of the present inventive concept with the singulation transporting device of EP2014/052546, the inlet may guide the containers towards the middle portion of the rotating surface, i.e. towards a first receiving area, where the containers are then singulated by means of the device disclosed in EP2014/052546.

The invention claimed is:

1. A device for singulation of used beverage or food containers received in bulk into individual objects, the device comprising:
   a first receiving area arranged for simultaneously receiving and keeping a plurality of containers;
   a second receiving area positioned at a higher vertical level than the first receiving area,
   wherein:
   the device further comprises a transporting device comprising a container elevating member for transporting a container from the first receiving area to the second receiving area, wherein the elevating member is attached to said transporting device, which transporting device is configured to move said container elevating member along a circumferential path around a first axis upon activation of the transporting device, which transporting device comprises a rotatable plate, a frame or a conveyor belt to which the elevating member is fixedly attached, said first axis being inclined at an angle of 5° to 45° relative the horizontal plane, and said container elevating member is locked to said circumferential path during the elevation of said containers;
   a container supporting surface of the container elevating member slopes downwardly as seen radially inwards, when said container elevating member is arranged at a container drop-off point along said circumferential path;
   said container drop-off point being arranged between said first receiving area and the point where the elevating member reaches its top most position along said circumferential path;
   the second receiving area comprises at least a portion of a conveyer belt;
   the first axis, when projected onto the horizontal plane, is provided at an angle to the longitudinal axis of the conveyor belt, when projected onto the horizontal plane, wherein said angle is between 95° and 130°;
   said conveyor belt is a V-conveyor comprising two belts; and
   each belt extends from a respective starting end to a respective distal end; and
   said starting end of one of the two belts is offset the starting end of the other belt along the extension of the V-conveyor.

2. The device according to claim 1, wherein the first axis is inclined relative to the horizontal plane by 5° to 40°.

3. The device according to claim 1, wherein the device comprises retaining means arranged for retaining a container in the transporting device while being brought from the first receiving area to the second receiving area.

4. The device according to claim 1, wherein the second receiving area is a portion of the conveyor belt.

5. The device according to claim 1, wherein the transporting device is arranged such that at portion of, or the whole of, the elevating member is arranged to travel through at least a portion of the first receiving area upon activation of the transporting device.

6. The device according to claim 1, wherein the length of the elevating member in the radial direction is between 2-20 c'", and/or wherein the length of the elevating member in orthogonal to the radial direction is between 2-20 c'".

7. The device according to claim 1, wherein the second receiving area comprises means for transporting a container towards a container inspection area.

8. A reverse vending machine comprising a device according to claim 1.

9. A method for singulating used beverage or food containers received in bulk into individual objects using a device for singulation according to claim 1, comprising:
   providing a bulk of containers in the first receiving area;
   providing the transporting device comprising the container elevating member for transporting the container from said first receiving area to the second receiving area being arranged at a higher vertical level compared to the first receiving area, wherein said container elevating member is attached to said transporting device;
   activating said transporting device, upon which activation said transporting device moves said container elevating member along a full circumferential path around the first axis, said first axis being inclined at the angle of 5° to 45° relative the horizontal plane, and said container elevating member is locked to said circumferential path during the elevation of said container from said first receiving area to said drop-off point, and
   when being transported along said circumferential path said container elevating member passes from a container pick-up section, via the container drop-off point, to its top most position in the vertical direction,
   wherein the container elevating member, when arranged at the drop-off point along said circumferential path, the container supporting surface of the container elevating member slopes downwardly as seen radially inwards.

* * * * *